(12) United States Patent
Vogel

(10) Patent No.: US 11,493,632 B2
(45) Date of Patent: Nov. 8, 2022

(54) TRACKER OF A SURVEYING APPARATUS FOR TRACKING A TARGET

(71) Applicant: Trimble Jena GmbH, Jena (DE)

(72) Inventor: Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 675 days.

(21) Appl. No.: 16/567,723

(22) Filed: Sep. 11, 2019

(65) Prior Publication Data
US 2020/0124730 A1  Apr. 23, 2020

(30) Foreign Application Priority Data

Oct. 17, 2018 (EP) ..................................... 18200908

(51) Int. Cl.
  *G01S 17/66* (2006.01)
  *G01C 11/06* (2006.01)
  *H04N 5/235* (2006.01)

(52) U.S. Cl.
  CPC .............. *G01S 17/66* (2013.01); *G01C 11/06* (2013.01); *H04N 5/2354* (2013.01)

(58) Field of Classification Search
  CPC .... G01S 17/66; G01S 17/4876; G01S 17/497; G01C 11/06; H04N 5/2354
  See application file for complete search history.

(56) References Cited

U.S. PATENT DOCUMENTS 5,883,969 A    3/1999  Le Gouzouguec et al.
5,905,592 A    5/1999  Gohdo et al.
6,069,656 A    5/2000  Silver
6,133,998 A   10/2000  Monz et al.
(Continued)

FOREIGN PATENT DOCUMENTS

DE   11 2012 007 096 T5   8/2015
EP       0 661 519 A1     7/1995
(Continued)

OTHER PUBLICATIONS

Extended European Search Report for Application No. 19155706.5, dated Jul. 10, 2019, 11 pages.
(Continued)

*Primary Examiner* — Kathleen V Nguyen
(74) *Attorney, Agent, or Firm* — Kilpatrick Townsend & Stockton LLP

(57) ABSTRACT

The present invention relates to a tracker and a surveying apparatus comprising the tracker, which improve the reliability of tracking a target. The tracker comprises a first imaging region having a plurality of pixels for taking a first image of a scene including the target; a second imaging region having a plurality of pixels for taking a second image of a scene including the target; a control unit to receive a timing signal indicating a time duration during which an illumination illuminating the target in the scene is switched on and off, control the first imaging region to take the first image of the scene when the timing signal indicates that the illumination unit is switched on, and control the second imaging region to take the second image when the illumination is switched off; and a read out unit configured to read out the first image from the first imaging region and the second image from the second imaging region and to obtain a difference image.

20 Claims, 9 Drawing Sheets

(56) References Cited

U.S. PATENT DOCUMENTS

| | | | |
|---|---|---|---|
| 10,917,601 B2 | 2/2021 | Glimm | |
| 2001/0050763 A1 | 12/2001 | Shirai | |
| 2003/0086072 A1 | 5/2003 | Fukumoto et al. | |
| 2004/0096095 A1 | 5/2004 | Watkins | |
| 2004/0208340 A1 | 10/2004 | Kirschner | |
| 2006/0114448 A1 | 6/2006 | Andersson et al. | |
| 2007/0104353 A1 | 5/2007 | Vogel | |
| 2008/0116354 A1 | 5/2008 | Kirschner et al. | |
| 2009/0235541 A1 | 9/2009 | Kumagai et al. | |
| 2010/0012765 A1 | 1/2010 | Solenne | |
| 2010/0037474 A1 | 2/2010 | Hertzman et al. | |
| 2010/0253931 A1 | 10/2010 | Meier et al. | |
| 2011/0023578 A1 | 2/2011 | Grässer | |
| 2011/0228099 A1 | 9/2011 | Rakes | |
| 2013/0003069 A1 | 1/2013 | Umeda et al. | |
| 2014/0009604 A1 | 1/2014 | Hinderling et al. | |
| 2014/0307252 A1* | 10/2014 | Hinderling | G01C 15/006 356/141.2 |
| 2015/0092180 A1 | 4/2015 | Nishita | |
| 2015/0177382 A1 | 6/2015 | Vogel et al. | |
| 2017/0168142 A1* | 6/2017 | Kumagai | H04N 5/2257 |
| 2018/0176492 A1 | 6/2018 | Bamji et al. | |
| 2019/0004619 A1 | 1/2019 | Kahle et al. | |
| 2020/0124417 A1 | 4/2020 | Vogel et al. | |
| 2020/0128201 A1 | 4/2020 | Glimm | |
| 2020/0166340 A1 | 5/2020 | Hinderling | |
| 2020/0263984 A1 | 8/2020 | Vogel | |

FOREIGN PATENT DOCUMENTS

| | | | |
|---|---|---|---|
| EP | 1 411 371 A1 | 4/2004 | |
| EP | 1 422 498 A1 | 5/2004 | |
| EP | 1 514 076 A1 | 3/2005 | |
| EP | 1 681 533 A1 | 7/2006 | |
| EP | 1 767 960 B1 | 10/2008 | |
| EP | 2 103 905 A2 | 9/2009 | |
| EP | 2 275 775 A2 | 1/2011 | |
| EP | 2 408 192 A2 | 1/2012 | |
| EP | 2 259 569 B1 | 6/2012 | |
| EP | 2 706 376 A1 | 3/2014 | |
| EP | 2 722 645 A2 | 4/2014 | |
| EP | 2 789 972 A1 | 10/2014 | |
| EP | 2 881 757 A1 | 6/2015 | |
| EP | 2 889 576 A1 | 7/2015 | |
| EP | 2 998 698 A1 | 3/2016 | |
| EP | 3 130 888 A1 | 2/2017 | |
| EP | 3 165 876 A2 | 5/2017 | |
| EP | 3 173 816 A2 | 5/2017 | |
| EP | 3 199 913 A1 | 8/2017 | |
| WO | 98/10255 A1 | 3/1998 | |
| WO | 99/34235 A1 | 7/1999 | |
| WO | 2007/079600 A1 | 7/2007 | |
| WO | 2007/118478 A1 | 10/2007 | |
| WO | 2013/037848 A1 | 3/2013 | |
| WO | 2014/195020 A1 | 12/2014 | |
| WO | 2015/017539 A1 | 2/2015 | |
| WO | 2015/136099 A2 | 9/2015 | |
| WO | 2016/008513 A1 | 1/2016 | |

OTHER PUBLICATIONS

U.S. Appl. No. 16/595,158 Notice of Allowance dated Oct. 5, 2020, 11 pages.

European Search Report for Application No. 18200906.8 dated Apr. 3, 2019, 10 pages.

U.S. Appl. No. 16/601,412 Non-Final Office Action dated Oct. 20, 2021, 7 pages.

U.S. Appl. No. 16/601,412 Final Office Action dated Apr. 12, 2022, 8 pages.

U.S. Appl. No. 16/568,060 Non-Final Office Action dated Apr. 26, 2022, 8 pages.

U.S. Appl. No. 16/829,992 Non-Final Office Action dated Jun. 10, 2022, 10 pages.

Extended European Search Report for Application No. 18200908.4, dated Jun. 25, 2019, 20 pages.

Topcon, DS Direct Aiming Station, White Paper; Topconcorporation: "White Paper WhitePaperforTopconDSeriesAutomaticAimingTotalStations X-pointingTechnology", Mar. 4, 2015; Doc. ID: WP-P-180-2TE; 5 pages, downloaded from the Internet Oct. 25, 2019 at http://www.topconcare.com/files/2013/7525/6386/DS_WP_P-180-2_TE.pdf.

Topcon, DS Series, Direct Aiming Station, White Paper; Topcon: "Compact Robotic Total Station designed to be both versatile and agile", Jan. 1, 2014, 4 pages, downloaded from the Internet Oct. 25, 2019 at http://www.topconcare.com/files/2013/7525/6386/DS_WP_P-180-2_TE.pdf.

Callenberg, C. et al., "Snapshot Difference Imaging using Time-of-Flight Sensors," ACM Transaction on Graphics, vol. 36, No. 6, Nov. 20, 2017, 10 pages.

\* cited by examiner

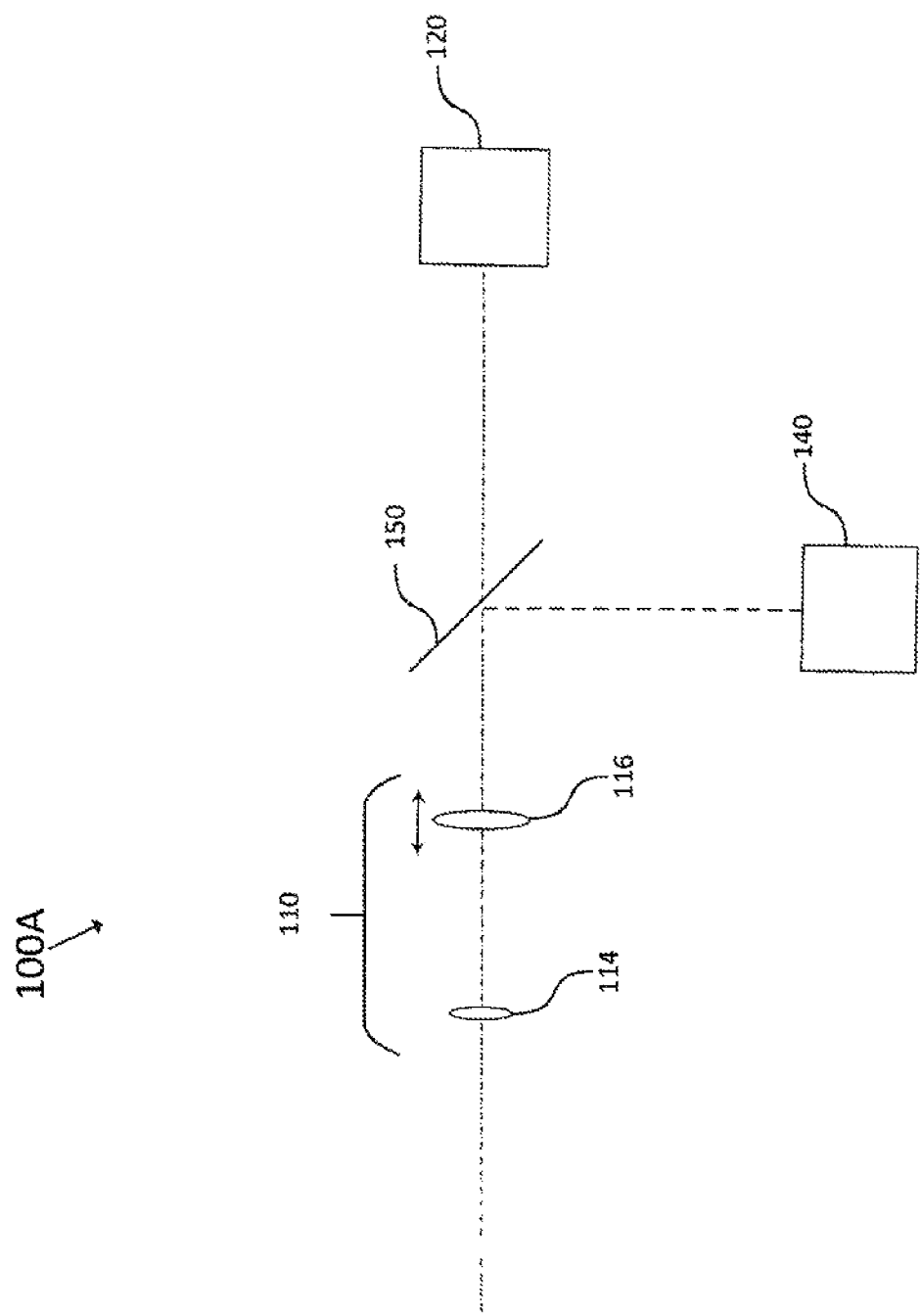

TRACKER OF A SURVEYING APPARATUS FOR TRACKING A TARGET

CROSS-REFERENCE TO RELATED APPLICATIONS

The present application claims priority to EPC Application No. 18200908.4, filed Oct. 17, 2018, the contents of which are incorporated herein by reference in their entirety for all purposes.

FIELD OF THE INVENTION

The present invention relates to a tracker and a surveying apparatus comprising the tracker as well as a method for tracking a target, and in particular, to a tracker having at least one imaging region with a plurality of pixels on an image sensor arrangement.

BACKGROUND

Optical instruments, such as geodetic or surveying instruments or apparatuses are commonly used for measuring a position of an object to obtain information, such as horizontal and vertical angles and distance. Newer instruments are often provided with a tracker, a.k.a. tracking unit or system, and an electronic imaging device, e.g. a camera, to acquire digital images of the object.

A conventional surveying instrument comprises a telescope system for sighting an object which can then be imaged on a camera behind the telescope system. Further, such an instrument may comprise a distance measurement unit to measure a distance to the object sighted by the telescope system. The viewing angle of the telescope system is generally very small, e.g. 1 to 2 degrees, and a user has to position the surveying instrument and adjust the optics of the telescope system so that the object to be sighted and to be measured is exactly in the small field of view of the telescope system and optimally on the optical axis of the telescope system, e.g. to measure a distance to the object.

However, in certain cases the object may move so that the user has to readjust the instrument each time anew before sighting the object and/or measuring the distance to the object.

Recently, surveying instruments with tracking systems have been proposed to automatically follow the position of a moving target, i.e. an object. For example, a laser tracker comprising a laser beam may be used to track an object. Thereby, a pivotable mirror may be used to deflect the focused laser beam in the direction of the object and the direction may then be recorded using the angles of the mirror position, for example for changing the optical axis of the instrument for distance measurement.

However, tracking a target is difficult and usually requires that a focused laser beam or other directed radiation hits and is reflected from a reflector at the target back to the tracker. It can be hard to meet this condition, especially when the target is moving quickly and/or when operating in a bright environment with a lot of background light and/or additional other reflections from the sun or other light sources.

It is also possible that the reflector (reflective target) when moving becomes temporarily occluded by an obstacle. This would also render tracking temporarily impossible leading to a target loss, or the tracker may get confused and erroneously consider reflections by the sun or other light sources as reflections of the target reflector.

SUMMARY OF THE INVENTION

Therefore, there is a need to improve the reliability of tracking a target and/or to decrease the search time needed by a tracker when searching for a target.

According to an embodiment, a tracker for tracking a target comprises a first imaging region having a plurality of pixels on an image sensor arrangement for taking a first image of a scene including the target and a second imaging region having a plurality of pixels on the image sensor arrangement for taking a second image of a scene including the target. The tracker further comprises a control unit configured to receive a timing signal, wherein the timing signal indicates a time duration during which an illumination unit illuminating the target in the scene is switched on and off. The control unit controls the first imaging region to take the first image of the scene when the timing signal indicates that the illumination unit is switched on, and controls the second imaging region to take the second image when the timing signal indicates that the illumination unit is switched off. The tracker further comprises a read out unit to read out, e.g. after taking the first and the second image, the first image from the first imaging region and the second image from the second imaging region and to obtain a difference image by determining a difference between the pixel values of the pixels of the first imaging region and the second imaging region so as to identify the target in the difference image. Accordingly, the sensitivity in detecting and tracking a target is increased, since, for example, bright or reflecting surfaces which could be confused with a target can be largely eliminated in the difference image. In particular, using two imaging regions allows the time between taking a first image and second image to be set short. As a result, tracking can be performed more reliably decreasing target losses when tracking a target and decreasing the time in finding a target. Further, the distance to the target can be increased, since the reduced noise allows for longer exposure times.

According to an advantageous embodiment, the image sensor arrangement of the tracker comprises a first and a second tracker receiver including the first and second imaging region, respectively, wherein each tracker receiver receives part of back-reflected tracking light split by a beam splitter. Accordingly, simple off-the-shelf camera chips can be used as tracker receivers which independently record a first and second image of basically the same scene, respectively.

According to an advantageous embodiment, the tracker is calibrated by setting the center of the second imaging region depending on the optical center of the first imaging region. Accordingly, alignment of the two imaging regions with respect to each other is simplified, since one imaging region can be set based on the other imaging region. For example, the first imaging region is glued in the tracker first and the second imaging region can be arranged making use of six degrees of freedom to obtain good alignment. Accordingly, a precise and simple alignment of the imaging regions can be performed.

According to an advantageous embodiment, the read out unit corrects, after taking the first and the second image, for a movement of the tracker in the time between taking the first and the second image by taking into account an offset between the scene on the first image and the scene on the second image, the offset corresponding to a shift in the scene due to the movement of the tracker. Accordingly, even movements of the tracker between taking the first image and the second image can be electronically corrected to improve the reliability of the target detection and avoid wasting time by taking images in a "stop-and-go" mode.

According to an embodiment, a tracker for tracking a target comprises an imaging region having a plurality of pixels on an image sensor arrangement for taking a first image of a scene including the target, for each pixel charges being collected in a charge storage corresponding to the image information of the first image, and for taking a second image of the scene including the target, for each pixel a charge value corresponding to the image information of the second image being removed from the charge value of the collected charges corresponding to the first image so as to generate a difference image. The tracker further comprises a control unit receiving a timing signal which indicates a time duration during which an illumination unit illuminating the target in the scene is switched on and off. The control unit controls the imaging region to take the first image of the scene when the timing signal indicates that the illumination unit is switched on, and controls the imaging region to take the second image when the timing signal indicates that the illumination unit is switched off. The tracker further comprises a read out unit to read out, after taking the first and the second image, the difference image from the image sensor arrangement so as to identify the target in the difference image. Accordingly, the sensitivity in detecting and tracking a target is increased, since, for example, bright or reflecting surfaces which could be confused with a target can be largely eliminated in the difference image. In particular, generating a difference image directly on an image sensor arrangement before a time consuming read out of each pixel allows the time between taking a first image and second image to be set short. As a result, tracking can be performed more reliably decreasing target losses when tracking a target and decreasing the time in finding a target.

According to an advantageous embodiment, the control unit is configured to reverse, after taking the first image, the polarity of pixels, so as to remove, in the sense of subtract or neutralize, the charges corresponding to the image information of the second image from the charges collected in the charge storage corresponding to the image information of the first image. Accordingly, a simple electrical circuit allows for generating a difference image directly in an image sensor arrangement.

According to an advantageous embodiment, the tracker comprises a tracker emitter for emitting tracking light on an optical tracker path. The tracker emitter may include the illumination unit so that the tracking light illuminates the target. Accordingly, tracking light may be provided which can be reflected by a reflective target in the scene so as to easily detect the target.

According to an advantageous embodiment, the tracker is adapted to issue an instruction to a surveying apparatus to move the optical axis of a lens arrangement of the surveying apparatus. Accordingly, the tracker can be used to autonomously control the movement of a lens arrangement so that a surveying apparatus can automatically follow a target and take images during its movement and/or measure the distance to the target.

According to an embodiment, a surveying apparatus is provided comprising a lens arrangement including at least one movably arranged focus lens element for focusing to sight a target; an imaging unit configured to obtain an image of at least a part of the target; and the tracker described above. Accordingly, a surveying apparatus may benefit from the advantages of the above described tracker.

According to an advantageous embodiment, the surveying apparatus further comprises a beam splitter/combiner configured to combine a part of the optical imaging path of the imaging unit and a part of the optical tracker path of the tracker so that the optical axis of the imaging unit and the optical axis of the tracker are at least coaxially arranged with the optical axis of the lens arrangement between the lens arrangement and the beam splitter/combiner. Accordingly, a compact optical setup is achieved in which the optical paths of the tracker and the imaging unit are combined so that the same lens arrangement is used for both.

According to an advantageous embodiment, the surveying apparatus further comprises a distance measuring unit configured to measure a distance to the target along the optical axis of the distance measuring unit. Accordingly, a distance to a target can be measured while the target is tracked.

According to an advantageous embodiment, the beam splitter/combiner is further configured to combine the part of the optical tracker path of the tracker, the part of the optical imaging path of the imaging unit and a part of the optical distance measuring path of the distance measuring unit so that the optical axis of the tracker, the optical axis of the imaging unit and the optical axis of the distance measuring unit are at least coaxially arranged with the optical axis of the lens arrangement between the lens arrangement and the beam splitter/combiner. Accordingly, a compact optical setup is achieved in which the optical paths of the distance measuring unit, tracker and the imaging unit are combined so that the same lens arrangement is used.

According to an embodiment, a method for tracking a target comprises taking a first image of a scene including the target on a first imaging region having a plurality of pixels; and taking a second image of a scene including the target on a second imaging region having a plurality of pixels. A timing signal is received before taking the images, the timing signal indicating a time duration during which an illumination of the target in the scene is switched on and off, and the first imaging region is controlled to take the first image of the scene when the timing signal indicates that the illumination is switched on and the second imaging region is controlled to take the second image when the timing signal indicates that the illumination unit is switched off. The method further comprises reading out the first image from the first imaging region and the second image from the second imaging region and obtaining a difference image by determining a difference between the pixel values of the pixels of the first imaging region and the second imaging region so as to identify the target in the difference image. Accordingly, the same advantages as mentioned above can be achieved; in particular, tracking can be performed more reliably decreasing target losses when tracking a target and decreasing the time in finding a target.

According to an embodiment, a method for tracking a target comprises taking a first image of a scene including the target on an imaging region having a plurality of pixels, for each pixel charges being collected in a charge storage corresponding to the image information of the first image; and taking a second image of the scene including the target on the imaging region, for each pixel a charge value corresponding to the image information of the second image being removed from the charge value of the collected charges corresponding to the first image so as to generate a difference image. A timing signal is received before taking the images, the timing signal indicating a time duration during which an illumination of the target in the scene is switched on and off; and the imaging region is controlled to take the first image of the scene when the timing signal indicates that the illumination unit is switched on, and the imaging region is controlled to take the second image when the timing signal indicates that the illumination unit is switched off. The method further comprises reading out the difference image from the imaging region so as to identify the target in the difference image. Accordingly, the same advantages as mentioned above can be achieved; in particular, tracking can be performed more reliably decreasing target losses when tracking a target and decreasing the time in finding a target.

According to an embodiment, a program is provided including instructions adapted to cause data processing means to carry out the above methods.

According to another embodiment, a computer readable medium is provided, in which the program is embodied, where the program is to make a computer execute the above methods.

According to another embodiment, a surveying system is provided comprising a remote control unit and the above described surveying apparatus, wherein the surveying apparatus comprises a communication interface to communicate with the remote control unit.

BRIEF DESCRIPTION OF THE DRAWINGS

FIG. 1A illustrates elements of a surveying apparatus.

DETAILED DESCRIPTION OF THE PREFERRED EMBODIMENTS

Figure 1B:
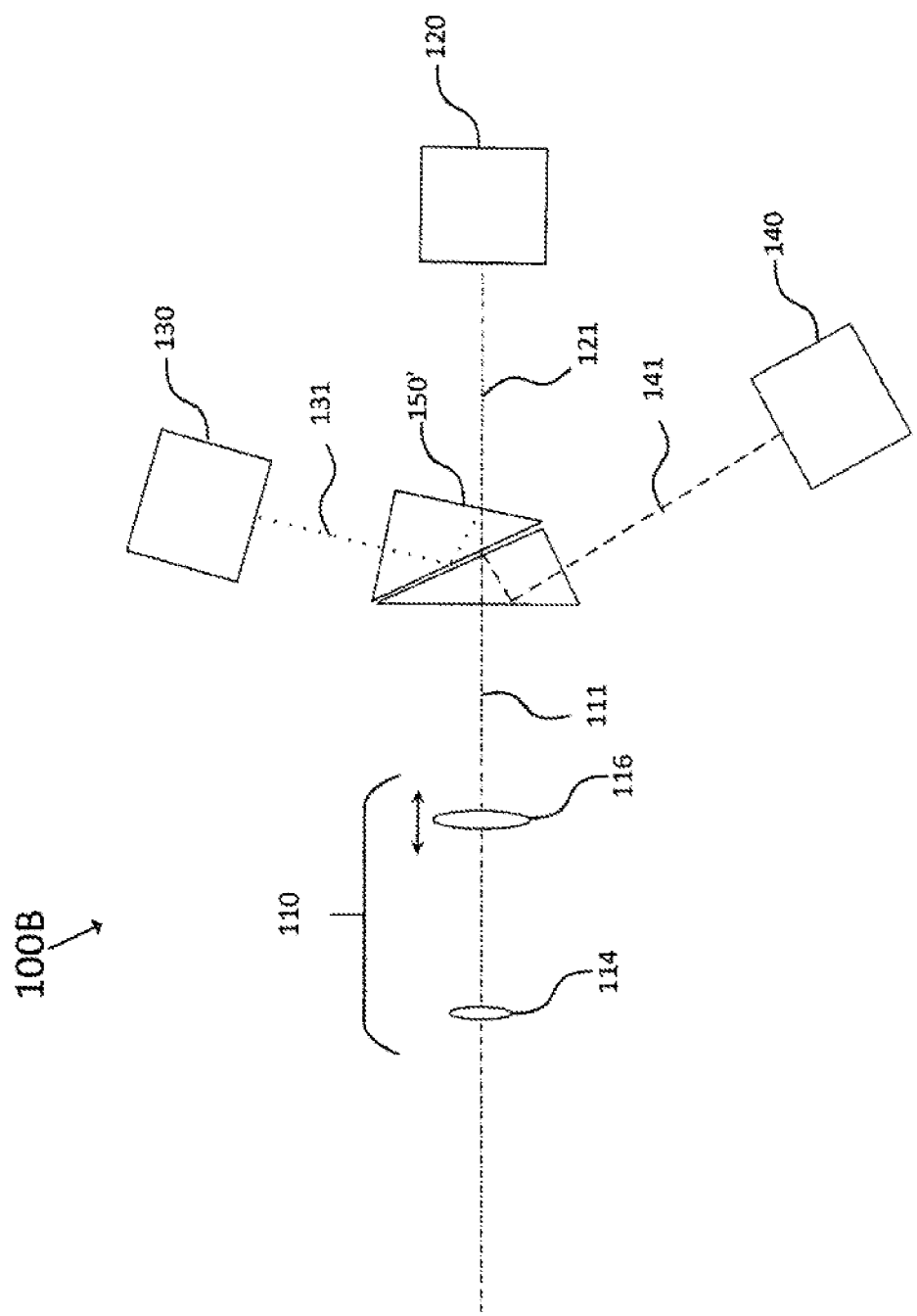
FIG. 1B illustrates elements of a surveying apparatus according to an embodiment.

Preferred embodiments of the invention are described with reference to the Figures. It is noted that the following description contains examples only and should not be construed as limiting the invention. In the following, similar or same reference signs indicate similar or same elements or functions.

Embodiments of the invention generally relate to trackers having an image sensor arrangement with a plurality of pixels so as to provide one or two imaging regions. By taking two images a difference image can be generated using the trackers. In particular, the trackers are designed such that for taking a second image of a scene including a target, there is no need to wait for reading out the image information of a first image of the scene taken first, since one tracker comprises two independent imaging regions to generate a difference image and the other tracker generates a difference image directly in the image sensor arrangement.

A calculated difference image preferably shows only reflectors like prisms, cat eyes or reflective foils as potential targets while suppressing reflections and other light from other sources. To recognize direction and amount of movements of the target with a high update rate and to avoid artifacts caused by moving sun reflections or other strong light sources it is important to minimize the time between the exposure moments of the two images used to calculate the difference image. This time minimum is usually defined by the read out time of the camera sensor and takes for a useable sensor like the Wide-VGA sensor MT9V034 from Aptina about 16 ms. Using the trackers presented herein, the time between two exposures can be reduced far below this time minimum.

In the following, first different optical setups of surveying apparatuses are discussed, some of which include a tracker, wherein details of the trackers of different embodiments are discussed in the context of the relevant figures.

FIG. 1A illustrates elements of a surveying apparatus 100A. The surveying apparatus 100A comprises a lens arrangement 110, an imaging unit 120, a distance measuring unit 140 and a beam splitter/combiner 150.

The lens arrangement 110 is provided to sight an object which is a target, such as a reflector. The optical arrangement 110 includes at least one movably arranged focus lens element 116 for focusing so as to sight the object. For example, the focus lens element may be an individual or compound focusing lens which is moved manually or automatically to produce in focus/out of focus images of the object which may be viewed through an ocular constituting a simple imaging unit. The lens arrangement 110 may be part of a telescope known in the art of surveying, and may comprise several optical lenses, such as lenses 114 and 116, so as to enable focusing and zooming. In one example, the lens arrangement 110 is attached to a positioning unit so as to change the direction of the optical axis of the lens arrangement which will be discussed in more detail with respect to FIG. 6.

The imaging unit 120 is configured to obtain an image of at least a part of the object sighted by the lens arrangement 110. The imaging unit 120 may be a simple lens or an ocular, a.k.a. eyepiece, so that an image can be obtained in the eye of the user. Alternatively, the imaging unit 120 may be a combination of an electronic imaging device, a microdisplay and an ocular so that an image can be recorded and viewed conventionally by eye through an ocular. Preferably the imaging unit 120 is an electronic imaging device, for example, a two-dimensional array of sensor elements capable of generating image information with a number of pixels generally corresponding to the number of elements of the array, such as a charge-coupled device (CCD) camera or a complementary metal-oxide semiconductor (CMOS) camera. Such a sensor array may be composed of 1000×1000 sensor elements or more to generate digital images with $10^6$ image pixels (1 megapixel) or more. However, also smaller sensor arrays are feasible, for example, composed of 480× 750 sensor elements, for example. Alternatively, the sensor array may be composed of avalanche photodiodes (APD) forming an APD array.

The distance measurement unit 140 is configured to measure a distance to the object along the optical axis of the distance measuring unit 140, which constitutes an optical measurement axis. For example, the distance measurement unit 140 uses an electronic distance measurement (EDM) to obtain measurement values about the distance. In one example, the distance measurement unit 140 includes a coherent light source, such as an infrared laser or another suitable laser, e.g. emitting in a red-wavelength range, and preferably a fast reflector-less working EDM. Conventionally collimated light is sent out in a radial direction from the surveying apparatus 100A to perform a distance measurement by using a pulse method or phase method as known in the art. Further, the intensity of a received EDM-Signal, i.e. the back-reflected signal of an electro-optical distance measurement, could also be used to obtain information about the distance to the reflecting object. A preferred embodiment of a distance measuring unit 140 will be discussed with respect to the distance measuring unit 240 in FIG. 2.

In FIG. 1A, a beam splitter/combiner 150 is provided and configured to combine a part of the optical imaging path of the imaging unit 120 and a part of the optical distance measuring path of the distance measuring unit 140 so that the optical axis of the imaging unit 120 and the optical axis of the distance measuring unit are coaxially arranged with the optical axis of the lens arrangement at least between the lens arrangement 110 and the beam splitter/combiner 150.

An optical axis may be regarded as an imaginary line that defines the path along which light propagates through the system, up to a first approximation. For a system composed of simple lenses and mirrors, an optical axis passes through the center of curvature of each surface, and coincides with the axis of rotational symmetry. The optical path may be regarded as the path that light takes when traversing an optical system, such as the lenses of the lens arrangement 110. The optical (beam) path is usually limited by a three-dimensional volume having the optical axis as an axis of rotational symmetry, in which light may travel. An example is provided with respect to FIG. 5 which is discussed below in more detail.

The optical axis of the imaging unit 120 is shown by the dot-and-dash line and the optical axis of the distance measuring unit 140 is shown by the dashed line. No preferred direction is given by the lines (optical reciprocity) but it is understood that light to be imaged on the imaging unit 120 travels from left to right. The beam splitter/combiner 150 combines these lines to obtain an overlap of the optical axes on the left part of the beam splitter/combiner 150 in FIG. 1A. Since these axes are parallel and overlapping, i.e. coaxial, to each other, and additional parallel and overlapping to the optical axis of the lens arrangement 110, they are also regarded coaxially arranged with respect to the optical axis of the lens arrangement 110.

In particular, the optical setup and especially the beam splitter/combiner 150 are chosen such that the optical axis of the lens arrangement 110 corresponds to the overlapping optical axes of the imaging unit 120 and the distance measuring unit 140 between the beam splitter/combiner 150 and the lens arrangement 110 as well as along the lens arrangement 110 so that light traveling in the respective optical paths is affected by the lenses 114 and 116 of the lens arrangement. Since the optical axes of the distance measuring unit 140 and the imaging unit 120 partly overlap, also the optical paths, i.e. the optical imaging path and the optical distance measuring path, of these units partly overlap when being combined by the beam splitter/combiner 150. In the apparatus, the center of the two dimensional array of sensor elements as imaging unit and the center of the tracking unit do not need to coincide with the optical axis of the lens arrangement 110. For example, in a calibration step, the center can be defined on the two dimensional array of sensor elements as the point where the optical axis coincides with the array.

It is understood that a coaxial arrangement of two or more optical axes is basically a theoretical assumption, since in practice the optical axes will usually not exactly overlap and point in the exact same direction but will overlap within some small error range. Thus, for ease of explanation we assume axes deviations of less than +/−0.2° still as coaxial. Typical alignment errors are in the order of +/−0.1° which can be corrected later in calibration by software.

Looking at FIG. 1A from a different perspective, according to the optical reciprocity principle, light originating on the left side in FIG. 1A, and thus entering the lens arrangement 110 from the left, will be split by the beam splitter/combiner 150. Therefore, describing that an optical path is split into two optical paths by the beam splitter/combiner (looking from left to right) is technically the same as describing that two optical paths are combined by the beam splitter/combiner (looking from right to left).

In a simple case, a semi-transparent mirror may be used as beam splitter/combiner dividing the incoming light into two parts, e.g. 50:50, one part reaching the imaging unit 120 and the other part reaching the distance measuring unit 140. Undesired distance measuring light in the imaging channel may then be filtered before it hits the imaging unit 120. In practice, however, a dichroic mirror or prism, i.e. a mirror or prism which is transparent for one wavelength range and reflective for the other, is used. This wavelength selectivity may be achieved with dichroic filters/films using the principle of thin-film interference. Using a dichroic mirror or dichroic prism thus allows using a large percentage of reflected and transmitted light, respectively.

Accordingly, depending on the light direction and the wavelength, in addition to its configuration to combine light beams, the beam splitter/combiner 150 is also configured to split light reflected from the object traversing the lens arrangement in imaging light along the optical imaging path and in distance measuring light along the optical distance measuring path.

It is clear from the above that the optical paths and optical axes are independent of the light traveling direction so that "splitting" and "combining" is merely used to better explain the optical layout. In particular, the imaging unit in these examples only receives light and does not send out any light so that the beam splitter/combiner does not combine light from the imaging unit and the distance measuring unit but is configured with an optical function that could do so, since light entering the surveying apparatus through the lens arrangement is split in different channels by the beam splitter/combiner. In other words, the optical function of the beam splitter/combiner is to combine different paths from its right side to overlap on its left side.

In one example, a laser diode of the distance measuring unit 140 may emit light in the red range of approximately 660 nm (or 635 nm) and the imaging unit 120 may image a scenery including an object reflecting visible wavelengths. Accordingly, if a dichroic mirror with a cut-off wavelength of approximately 620 nm, i.e. wavelengths larger than 620 nm are reflected, is provided (alternatively a notch filter blocking light around 635 nm), distance measuring and imaging may be achieved in separate channels with hardly any loss in intensity. Using a dichroic prism design further allows to glue a camera chip of an imaging unit directly onto parts of the prism so that a highly compact structure is achieved which is largely insensitive to temperature changes and external shocks while mechanic components for attaching and aligning a camera chip can be saved.

Additional reliability of the measurements of the surveying apparatus can be achieved if the lens 116 in the lens arrangement 110 facing the beam splitter/combiner has a convex side, e.g. a plano-convex or a bi-convex lens, which faces the beam splitter/combiner. As a result, reflections from this lens of distance measuring light from the distance measuring unit 140 may not be reflected back to the distance measuring unit 140 so as to avoid crosstalk which could lead to the detection of signals not coming from the actual target (object). Furthermore, anti-reflection coatings on the lenses of the lens arrangement may also reduce crosstalk. When using a prism as the beam splitter/combiner 150, an intermediate focus should be placed outside and not inside the prism and the surface(s) of the prism on which light is incident may be slightly tilted with respect to an orthogonal direction so that light is not fully orthogonally incident thereon. Furthermore, air gaps between individual prisms for total reflection can be provided where appropriate.

In FIG. 1B, an embodiment of a surveying apparatus is provided which further builds on the surveying apparatus 100A of FIG. 1A. Specifically, the surveying apparatus 100B comprises the same elements as the surveying apparatus 100A and additionally comprises a tracker 130.

The tracker 130 is configured to track the object, e.g., a triple prism reflector as target, by using preferably infrared light at a wavelength of 850 nm (or 810 nm) as illumination light. As directly understandable from FIG. 1B, the beam splitter/combiner 150 of FIG. 1A needs some modification to combine/split the three beam paths of the tracker 130, the imaging unit 120 and the distance measuring unit 140, respectively. Thus, the beam splitter/combiner 150' is configured in FIG. 1B to combine a part of the optical tracker path of the tracker 130, a part of the optical imaging path of the imaging unit 120 and a part of the optical distance measuring path of the distance measuring unit 140 so that the optical axis of the tracker, the optical axis of the imaging unit and the optical axis of the distance measuring unit are coaxially arranged with the optical axis of the lens arrangement 110 at least between the lens arrangement and the beam splitter/combiner 150'. Thus, the lens arrangement 110 is shared by the tracking, distance measuring and imaging functions.

In more detail, in FIG. 1B, the optical axis of the tracker 130 is shown by the dotted line 131, the optical axis of the imaging unit 120 is shown by a dot-and-dash line 121 and the optical axis of the distance measuring unit 140 is shown by the dashed line 141. In FIG. 1B, it is schematically shown how light of these optical axes is reflected and transmitted by the beam splitter/combiner 150' to coincide with the optical axis 111 of the lens arrangement 110.

The prism system shown in FIG. 1B is a multi-channel prism. In particular, the prism system comprises two prisms having wedge shapes. In a preferred embodiment, the beam splitter/combiner 150' comprises at least two wedge shaped prisms and wavelength selective surfaces. A wavelength selective surface is any surface which reflects different wavelengths differently. In the above example of the dichroic mirror (or similar dichroic prism), the dichroic mirror (or dichroic prism) may also comprise a wavelength selective surface. The more optical paths need to be combined, the more prisms or mirrors (or combinations thereof) need to be provided. Thus, in a preferred embodiment having three functional modules, such as tracker 130, imaging unit 120 and distance measuring unit 140, the prism system is made up of two dichroic prisms having dichroic mirror-like surfaces.

The skilled person realizes that instead of using preferably the two dichroic prisms shown in FIG. 1B also two dichroic mirrors may be used. Therefore, similar to FIG. 1A, the optical axes of the tracker, distance measuring unit and imaging unit can be coaxially arranged with the optical axis of the lens arrangement 110 on the left side of the beam splitter/combiner 150'.

In one embodiment, the tracker 130 comprises a tracker receiver and a tracker emitter. For example, the tracker emitter is disposed together with the tracker receiver in the same tracker unit 130. In this example, the tracker emitter emits tracking light on the optical tracker path, i.e. along the optical axis 131 and 111. Details of such an arrangement are provided with respect to FIG. 5.

In another embodiment, the tracker 130 comprises two tracker receivers each receiving a part of back-reflected tracking light split by a beam splitter, e.g. prism cube. In this example, the tracker emitter may be placed at one end of the lens arrangement 110, for example, and may constitute a ring of LEDs around an opening of the lens arrangement.

The tracking light may have a wavelength in the infrared range, such as 850 nm, the distance measuring light may have a wavelength in the red range, such as 633 nm, e.g. from a He—Ne-Laser, and the imaging unit may receive visible light below the red distance measuring light. The prism system 150' may then be provided with suitable wavelength selective surfaces to guide outgoing light to and through the lens arrangement 110 and separate incoming light to reach the three individual channels.

Accordingly, the incoming light which may comprise tracking light reflected from the object, ambient light reflected from the object as well as from other structures in the field of view of the surveying apparatus and distance measuring light reflected from the object, enters the lens arrangement 110, wherein the beam splitter/combiner 150' is configured to split this reflected light from the object (as well as other structures) traversing the lens arrangement into tracking light along the optical tracker path 131, into imaging light along the optical imaging path 121 and into distance measuring light along the optical distance measuring path 141.

In another embodiment, the surveying apparatus 100A, 100B further comprises a thermal imaging camera configured to acquire an image of at least part of the object in a wavelength range above the visible range. For example, the thermal imaging camera may be an infrared camera replacing the imaging unit 120 in FIG. 1A or 1B, or the tracker 130 in FIG. 1B. The thermal imaging camera may also be provided in addition to the three functional modules 120, 130, and 140 in FIG. 1B so that a different prism system with one more channel needs to be provided.

Figure 1C:
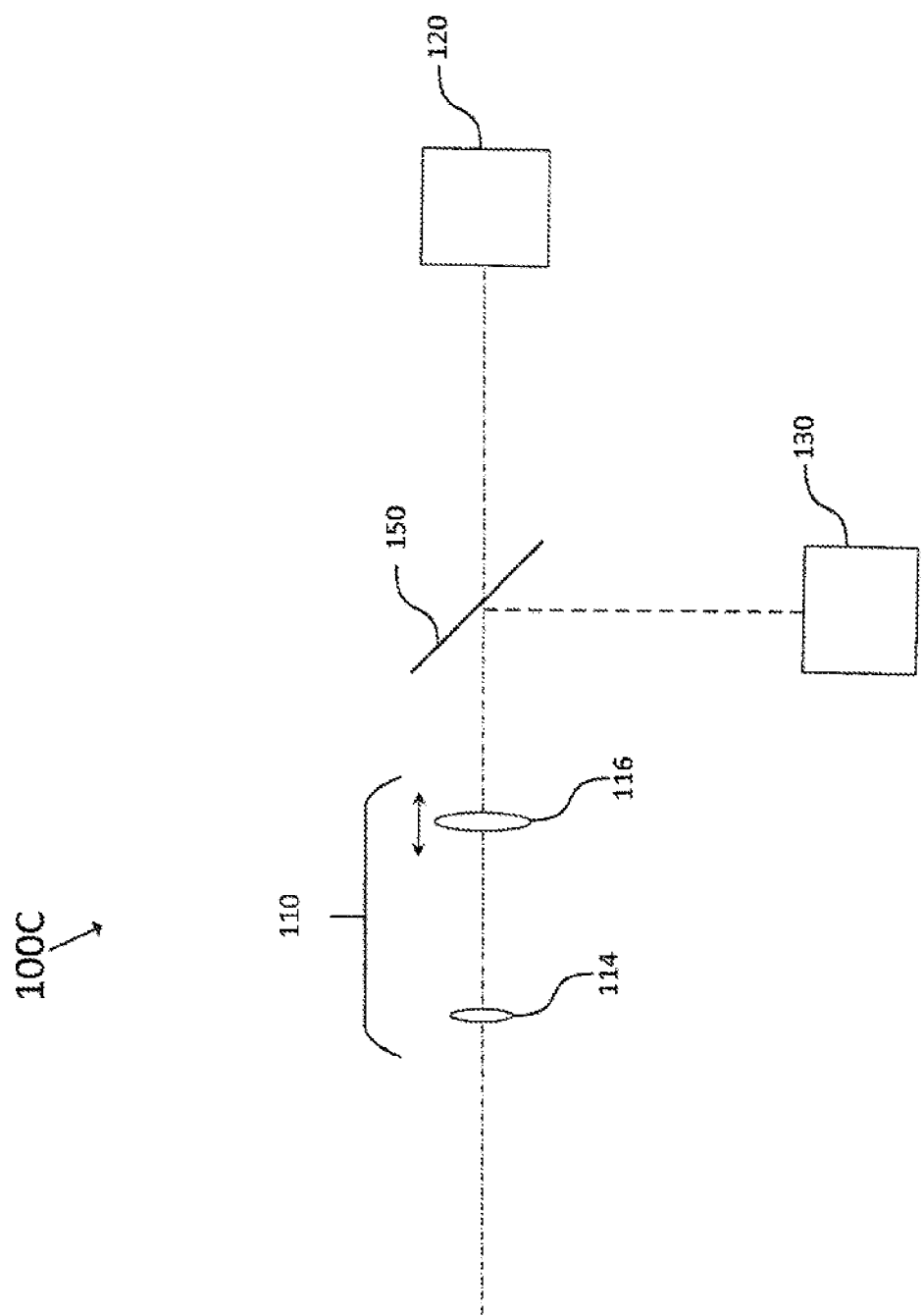
FIG. 1C illustrates elements of a surveying apparatus according to another embodiment.

FIG. 1C illustrates elements of another example of a surveying apparatus 100C. The surveying apparatus 100C comprises a lens arrangement 110, an imaging unit 120, a tracker 130 and a beam splitter/combiner 150. The surveying apparatus 100C corresponds to the surveying apparatus 100A but the distance measuring unit 140 is replaced by the tracker 130, wherein specific trackers which can be used as tracker 130 are discussed below with respect to FIGS. 7A and 7B as well as 8A and 8B. In the surveying apparatus 100C the optical axis of a distance measuring unit (not shown), if included, may be parallel to the optical axis of the lens arrangement.

The surveying apparatus 100A, 100B or 100C may be integrated in or constituted by a video surveying instrument, such as a video theodolite or a video tacheometer, also known as a tachymeter or total station or any other kind of optical instrument used for surveying, and in particular for determining angles and distances to an object to derive the position of the object.

Two tracker designs will be explained in more detail in the following, each of which can be implemented in the surveying apparatuses described with respect to FIGS. 1B and 1C as well as FIGS. 2, 3, 5 and 6.

Figure 7B:
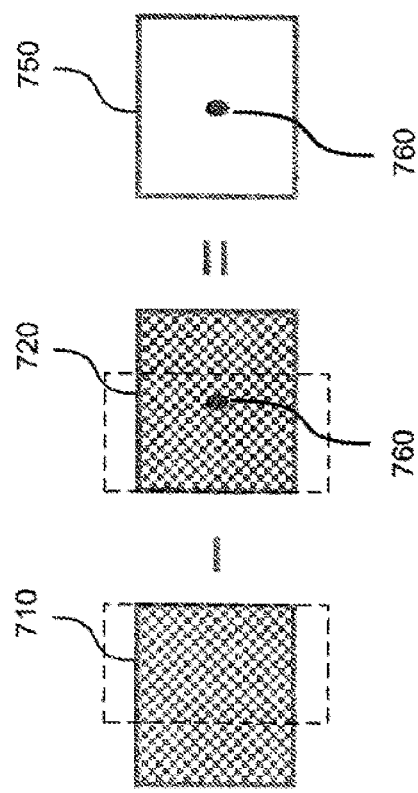
FIG. 7B illustrates qualitatively the function of a tracker according to an embodiment.
Figure 7A:
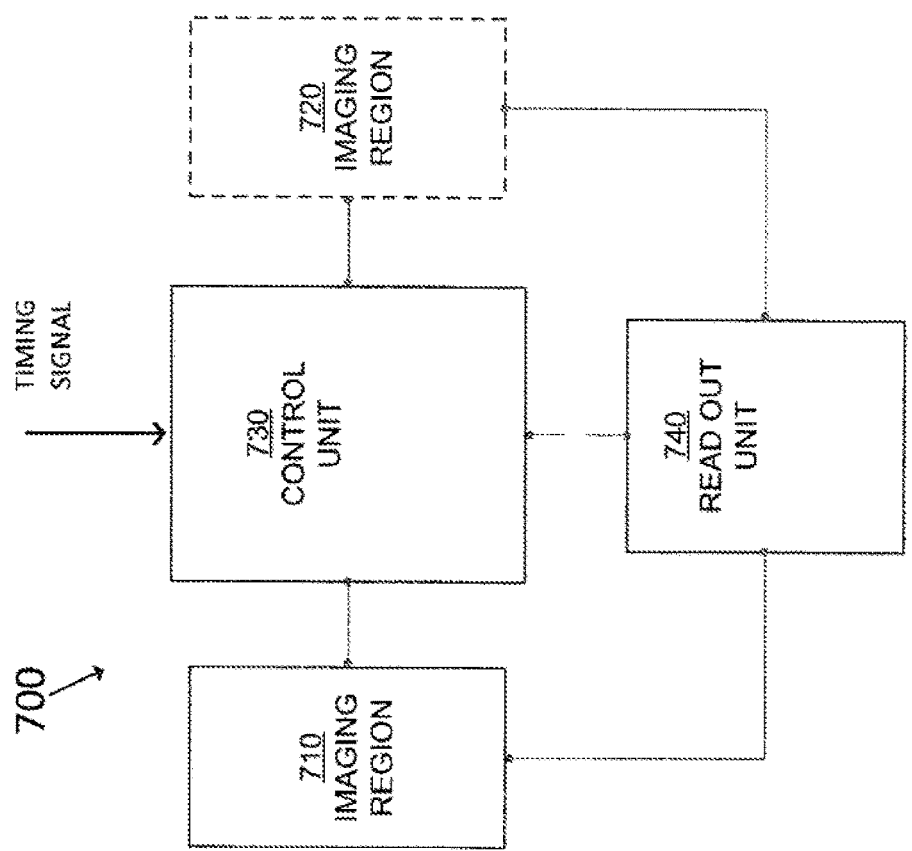
FIG. 7A illustrates functional elements of a tracker according to an embodiment.

The first tracker design is depicted in FIG. 7A. This tracker 700 comprises a first imaging region 710, a second imaging region 720, a control unit 730 and a read out unit 740.

Figure 2:
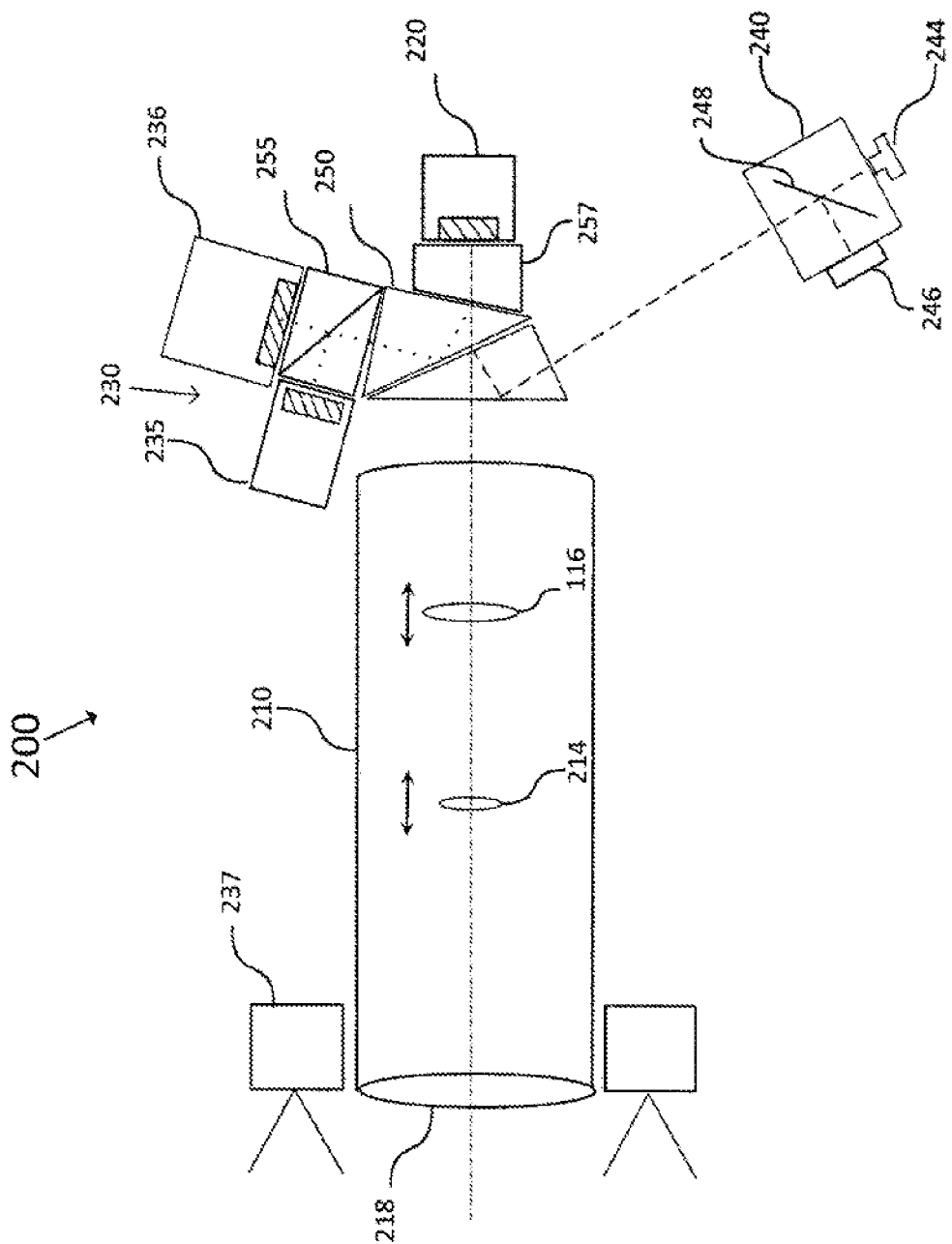
FIG. 2 illustrates a detailed embodiment of a surveying apparatus.

The first imaging region 710 having a plurality of pixels may be a part of a first tracker receiver, e.g. tracker receiver 235 of FIG. 2, and the second imaging region 720 having a plurality of pixels may be a part of a second tracker receiver, e.g. tracker receiver 236 of FIG. 2. The two tracker receivers may thus form an image sensor arrangement, wherein a first image can be recorded by the first imaging region and a second image can be recorded by the second imaging region. Each image may include a scene including an object which constitutes the target to be tracked.

The control unit 730 is configured to receive a timing signal as illustrated in FIG. 7A, which indicates a time duration during which an illumination unit illuminating the target is switched on and off. For example, the presence of this signal may indicate when an illumination unit, such as a tracker emitter, is switched on, and the absence of this signal may indicate when an illumination unit is switched off. By switching on and off an illumination light of a scene including a preferably reflective target, it is possible to obtain two images one with a bright, e.g. light reflecting, target and one with a dark target, i.e. no illumination light is emitted/reflected from the target.

In more detail, the tracker control unit 730 can control the first imaging region 710 to take the first image of the scene when the timing signal indicates that the illumination unit is switched on (or off), and can similarly control the second imaging region 720 to take the second image when the timing signal indicates that the illumination unit is switched off (or on). Hence, the pixels of the first imaging region 710 record image information of the scene with illumination and the pixels of the second imaging region 720 record image information of the scene without illumination.

When "first" and "second" are used in this description, it should be understood that these terms shall not be construed to give any limitation to the specific time sequence. In other words, taking a "second image" may come in time before taking a "first image" so that the image which is taken first in time is taken while the illumination unit is switched off and the other image is taken while the illumination is on. Hence, the terms "first" and "second" are merely used to distinguish two different imaging regions and images which are taken at two different times.

The read out unit 740 then reads out the first image from the first imaging region 710 and the second image from the second imaging region 720 and obtains a difference image. To obtain the difference image, the read out unit 740 determines a difference between the pixel values of the pixels of the first imaging region and the second imaging region. That is, by subtracting a pixel value of the first imaging region from a pixel value of the second imaging region belonging to the same or similar part of the scene, the image information of the scenes with and without illumination are subtracted leaving a difference image, which shows only the illuminated target and eliminates other highly reflective structures in the scene which could be erroneously considered a reflective target by the tracker. Accordingly, the target may be identified in the difference image with high accuracy.

The subtraction of a second image from a first image, or vice versa, is qualitatively illustrated in FIG. 7B. In this figure, the imaging region 710 recorded a scene without illumination so that no target is seen and the imaging region 720 recorded a scene with illumination so that target 760 can be obtained as an absolute value independent of the sequence of subtraction. The difference image 750 is obtained by subtracting the pixels of the imaging region 720 from the pixels of the imaging region 710, which correspond to the same position, i.e. the pixel values are subtracted from each other which have recorded the same or similar parts of the scene. As becomes evident from FIG. 7B, the second image taken with illumination on may also be taken before the first image or vice versa. Since the target is only seen in the image with illumination on and the rest of the scene (basically considered noise) is roughly the same in both images, the result of the subtraction is a clear image of the target, independent of whether an image with illumination on and then an image with illumination off is taken, or vice versa.

The pixels of the imaging regions 710, 720 may be pixels of a charge-coupled device (CCD) camera chip or a complementary metal-oxide semiconductor (CMOS) camera chip. The sensor arrays of such camera chips may be composed of 1000×1000 sensor elements or more to generate digital images with $10^6$ image pixels (1 megapixel) or more. However, also smaller sensor arrays are feasible, for example, composed of 480×750 sensor elements.

As known in the art of CCD or CMOS camera chips, pixel responses are not necessarily the same in different chips and faulty pixels, e.g. hot pixels, may lead to always on or always off pixels. Thus, subtraction of image information of two different imaging regions of different chips recording the exact same scene does not necessarily lead to a complete reduction of image information to zero. However, remaining pixel values may be set to zero electronically in a calibration procedure.

Compared to taking two images with one imaging region and reading out the imaging region before taking a second image, the time to take a second image can be drastically shortened using two imaging regions. This particularly reduces the risk that the scene changes between two exposures which could lead to the difference image including artifacts. For example, a car may drive through the scene or the scene may change if the tracker is moved recording a different scene in the second image compared to the first image. Accordingly, the sensitivity in detecting and tracking a target is increased, since, for example, bright or reflecting surfaces which could be confused with a target can be largely eliminated in the difference image. As a result, tracking can be performed more reliably decreasing target losses when tracking a target and decreasing the time in finding a target. For example, only the exposure time and time of flight of the tracking light may be between taking the images.

Moreover, even if the time between taking the first and the second image is short, the read out unit 740 may correct for a possible movement of the tracker in the time between taking the first and the second image by taking into account an offset between the scene on the first image and the scene on the second image. The offset in this case corresponds to a shift in the scene due to the movement of the tracker. However, as can be seen in FIG. 7B, if the target is kept roughly in the middle of the image, it is possible to account for the offset by electronically shifting the scene. For example, if the scenes recorded in the imaging regions 710, 720 do not fully match (e.g. parts of the scene on the left side are not present anymore in the second image due to movement of the tracker to the right) but only two thirds of the pixel columns on the right side of the first imaging region (see dashed rectangle) match two thirds of the pixel columns on the left side of the second imaging region, it is sufficient to subtract only two thirds of the imaging regions to obtain the target. Since the angle positions at which the scenes were taken (with and without illumination), this subtraction of only parts of the imaging regions can be performed very accurately.

According to an embodiment, a method for tracking a target carried out by tracker 700 may comprise receiving in a first step a timing signal indicating a time duration during which an illumination of the target in a scene is switched on. In a second step, the method may comprise taking a first image of the scene including the target when the timing signal indicates that the illumination is switched on (or off) and then taking a second image when the timing signal indicates that the illumination unit is switched off (or on). Finally, the method further comprises reading out the first image from a first imaging region and the second image from a second imaging region and determining a difference between the pixel values of the pixels of the first imaging region and the second imaging region so as to identify the target in a difference image.

Figure 4:
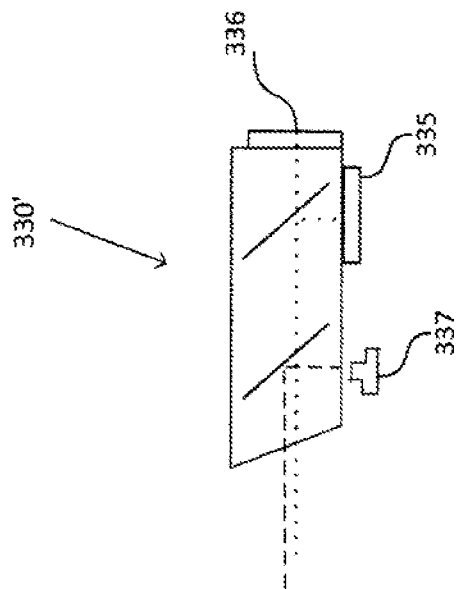
FIG. 4 illustrates a specific embodiment of a tracker which can be used together with the surveying apparatus.
Figure 3:
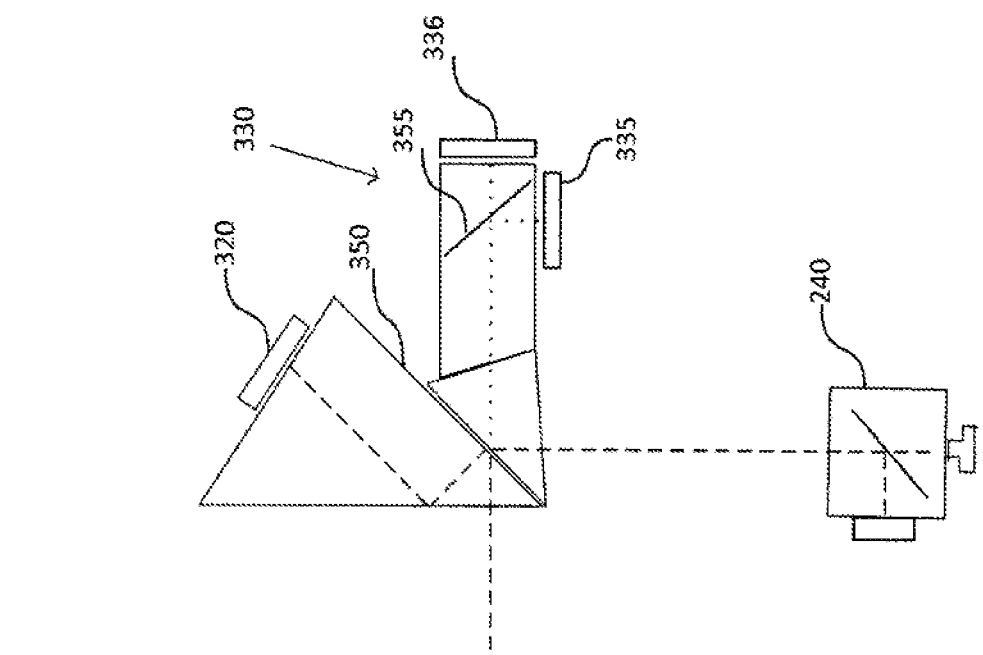
FIG. 3 illustrates a part of a surveying apparatus having an alternative arrangement of functional modules.

The tracker 700 of FIG. 7A can be incorporated in different surveying apparatuses. For example, in FIG. 2 the tracker is incorporated as tracker 230, wherein the image sensor arrangement comprises the tracker receiver 235 including an imaging region (see hatched area) and the tracker receiver 236 including another imaging region (see hatched area). Back-reflected tracking light is split by the beam splitter 255 which is discussed in more detail below. The same optical arrangement is also shown in FIGS. 3 and 4 where elements 335, 336 and 355 correspond to elements 235, 236 and 255.

Using two individual imaging regions in the tracker provides also for simple ways of alignment. In a mechanical alignment, the first imaging region may be glued on a beam splitting cube and the second imaging region may be glued depending on the position of the first imaging region. Additionally, electronic image transformation can be used for alignment or for a more precise alignment even before operation in the field. In particular, the geometrical center of the two dimensional array of pixels of the first imaging region and the geometrical center of the second imaging region do not need to coincide with each other. For example, in a calibration step, the tracker is calibrated by setting the center of the second imaging region depending on the optical center of the first imaging region. In more detail, a light spot in the center of the first imaging region is also recorded in the second imaging region and the position on which the spot is incident on the second imaging region is defined as center. Further, a calibration method may be provided in which the same target is recorded with the first imaging region and the second imaging region so that using the obtained coordinates enable the extraction of parameters for a transformation between the two regions. For example, up to six parameters may be used for calibration, namely the six degrees of freedom. Additionally, by recording the same image with two regions of two tracker receivers, the sensitivity of the different tracker receivers may be calibrated by applying different gain factors.

Figure 8B:
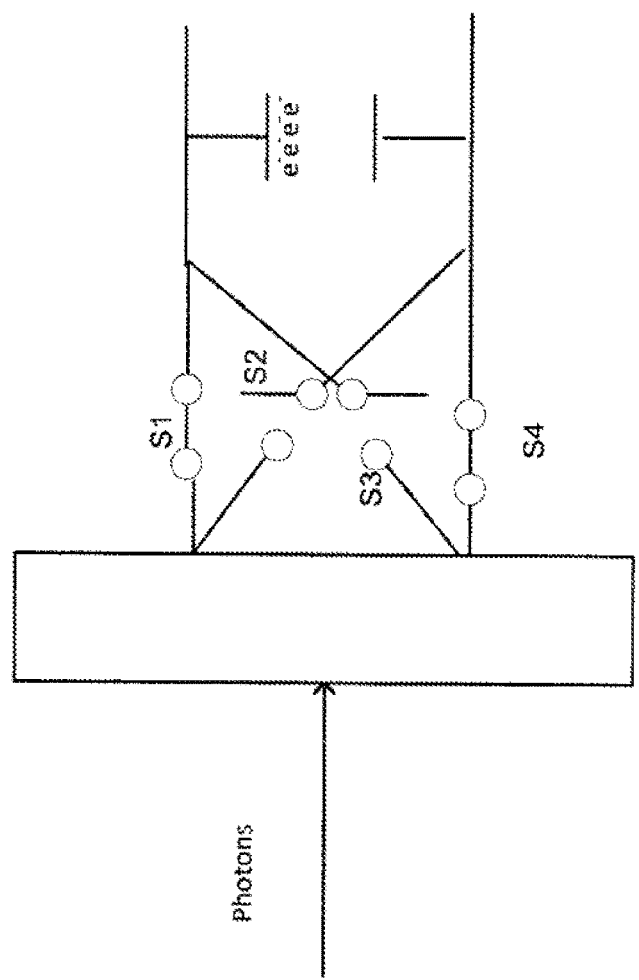
FIG. 8B illustrates qualitatively the function of a tracker according to another embodiment.
Figure 8A:
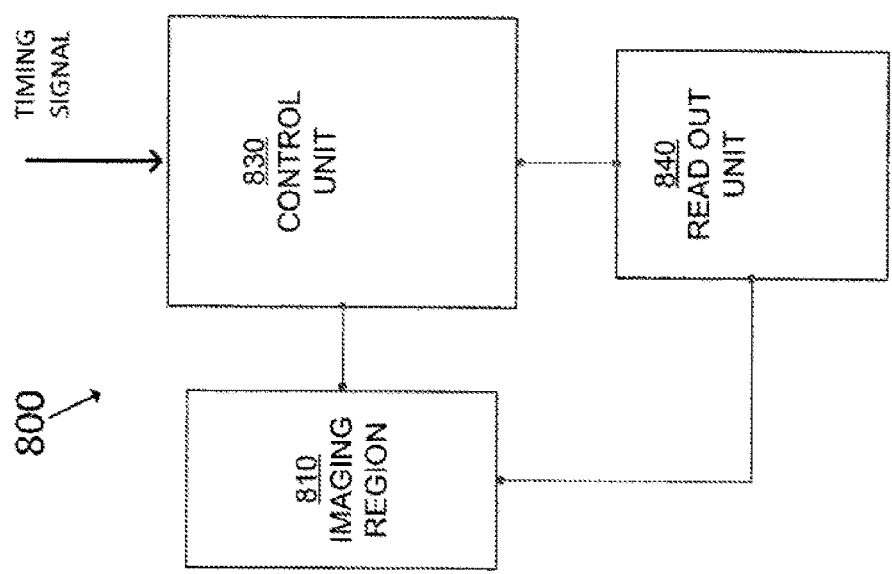
FIG. 8A illustrates schematically an embodiment of a tracker having only one tracker receiver including one imaging region providing a difference image.

The second tracker design is depicted in FIG. 8A and the setup is largely identical to the first tracker design depicted in FIG. 7A, merely the second imaging region 720 can be omitted. However, the imaging region 810, the control unit 830 and the read out unit 840 have a different functionality compared to the corresponding elements in FIG. 7A; an example of the functionality will be discussed with respect to FIG. 8B.

The tracker 800 according to the second tracker design comprises an imaging region 810, a control unit 830 and a read out unit 840.

Figure 5:
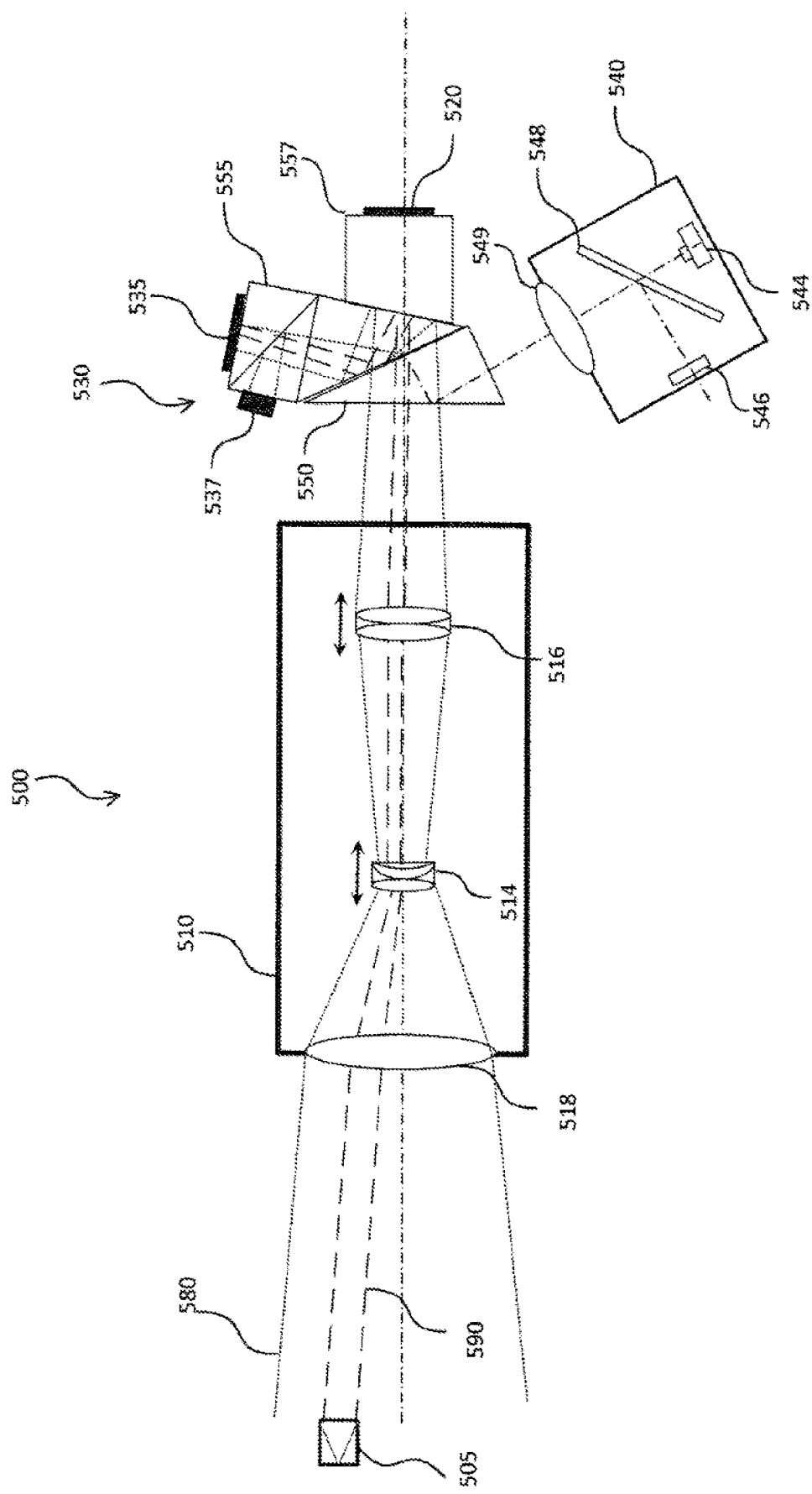
FIG. 5 illustrates a specific embodiment of a surveying apparatus including a tracker and an optical tracker path.

The imaging region 810 having a plurality of pixels on an image sensor arrangement may be part of a tracker receiver, such as tracker receiver 535 of FIG. 5. In one step, the imaging region 810 takes a first image of a scene including the target so that for each pixel of the imaging region 810 charges being collected in a charge storage of the pixel and the overall charges at all pixels correspond to the image information of the first image.

In another step, the imaging region 810 takes a second image of the scene including the target, wherein for each pixel a charge value corresponding to the image information of the second image is removed from the charge value of the collected charges corresponding to the first image. In essence, by removing charges, in the sense of subtracting or neutralizing charges, i.e. charge values constituting voltage potentials, of two images, a difference image can be generated without first reading out the first image and second image.

The control unit 830 is configured to receive a timing signal as illustrated in FIG. 8A and discussed with respect to FIG. 7A, wherein the timing signal indicates a time duration during which an illumination unit illuminating the target in the scene is switched on and off. By switching on and off an illumination light of a scene including a preferably reflective target, it is possible to obtain a first and a second image one with a bright, e.g. light reflecting, target and one with a dark target, i.e. no illumination light is emitted/reflected from the target.

The control unit 830 controls the imaging region 810 to take the first image of the scene when the timing signal indicates that the illumination unit is switched on (off), and controls the imaging region 810 to take the second image when the timing signal indicates that the illumination unit is switched off (on). Thus, the control basically corresponds to the control discussed with respect to control unit 730.

As mentioned above, "first" and "second" should not be construed to give any limitation to a specific time sequence so that taking a "second image" may come in time before taking a "first image". Hence, the terms "first" and "second" are merely used to distinguish two images which are taken at two different times.

The read out unit 840 reads out, after taking the first and the second image and generating the difference image, the difference image from the image sensor arrangement so as to identify the target in the difference image.

The charge storages of the pixels may have functions of a capacitor and regarded as part of the image sensor arrangement which may be part of the tracker receiver. For example, as mentioned above, the pixels of the imaging region 810 may be pixels of a charge-coupled device (CCD) camera chip or a complementary metal-oxide semiconductor (CMOS) camera chip.

These chips are usually made up of pixels, each of which can be considered to comprise a MOS (metal-oxide semiconductor) capacitor. As light, e.g. sunlight reflected from a scene and tracking light reflected from a target, falls on each pixel, the incident photons hit the material of the pixel and knock electrons out of place according to the photoelectric effect. These electrons are stored in the pixel's capacitor. The charges may then build up as illustrated in FIG. 8B. At this stage, the image is still in analog form, with the charge, or amount of electrons on the capacitor, each pixel charge directly corresponding to the amount of light that has hit it. Conventionally, the charges are read out for each image which may take several milliseconds.

In the tracker 800, the control unit is configured to reverse, after taking the first image, the polarity of pixels, so as to remove, i.e. subtract or neutralize/equalize, the charges corresponding to the image information of the second image from the charges collected in the charge storage corresponding to the image information of the first image. In other words, the charge values of the charges collected in the charge storage corresponding to the image information of the first image are at least partly diminished (or even neutralized or equalized) by the charge values of the charges corresponding to the image information of the second image.

Reversing the polarity to achieve this "reduction" or "neutralization"-effect can be achieved in several ways, e.g. by switching switches so that the charges of the first and second images are collected on opposite sides of a capacitor or by taking two images during the pixel read-out cycle similar to correlated double sampling.

As illustrated in FIG. 8B, switches S1, S2, S3 and S4 are switched between taking a first and taking a second image, which may be realized by transistors. By setting switches S1 and S4 in the ON position (as shown in FIG. 8B), it is possible to basically store the electrons obtained from incident photons of the first image on one side of the capacitor, which is an example of a charge storage, and the electrons obtained from the photons of the second image on the other side of the capacitor. In more detail, to achieve this distribution, the control unit 830 switches the switches after the first exposure such that for the second image the lower side of the capacitor receives the electrons (switches S1 and S4 are switched from ON to OFF and switches S2 and S3 from OFF to ON).

In this way, the pixel storage functionality allows to build the difference of integrated signal values from two consecutive exposures such that the read signal equals to the difference of the two exposures. For example, if a pixel charge of the first and the second image is identical, the same number of electrons is on opposite sides of the capacitor so that no resulting voltage, hence signal, is obtained. Carrying out this process for all pixels of the imaging region leads to a difference image.

In correlated double sampling two images are taken, namely one when the pixel is still in the reset state and one when the charge has already been transferred to the read-out node. The two values of each pixel are then used as differential signals in further stages, such as programmable gain amplifiers (PGA) or analog-digital-converter (ADC), so that a difference image can be obtained. In essence, in the present case, the output of a sensor, such as a camera chip, is measured twice, once in an illumination "on" condition and once in an illumination "off" condition, and a difference of the measured values is taken, effectively reversing the polarity of the pixels. For example, correlated double sampling can be used in switched capacitor operational amplifiers and when used in imagers, correlated double sampling is a noise reduction technique in which the reference voltage of the pixel, i.e., the pixel's voltage after it is reset, is removed from the signal voltage of the pixel, i.e., the pixel's voltage at the end of integration, at the end of each integration period.

According to an embodiment, a method for tracking a target carried out by tracker 800 may comprise receiving in a first step a timing signal indicating a time duration during which an illumination of the target in a scene is switched on. In a second step, the method may comprise taking a first image of the scene including the target when the timing signal indicates that the illumination is switched on (or off) and then taking a second image when the timing signal indicates that the illumination unit is switched off (or on). When taking the first image charges are collected for each pixel in a charge storage corresponding to the image information of the first image. When taking the second image, a charge value for each pixel corresponding to the image information of the second image is removed from the charge value of the collected charges corresponding to the first image so as to generate a difference image. Finally, the method further comprises reading out the difference image so as to identify the target in the difference image.

For both tracker designs it does not matter whether the tracker emitter is placed next to the tracker receiver (see e.g. FIG. 5) or placed at one end of the lens arrangement 110 (see e.g. FIG. 2), for example, and may constitute a ring of LEDs around an opening of the lens arrangement. Indeed, instead of a tracker emitter, such as emitters 537 or 237, emitting light to be reflected at the target, the target itself may include an illumination unit so that the target may be an active target receiving a timing signal to turn on or off the illumination unit. The two tracker designs have different advantages and disadvantageous. For example, while the second tracker design has the disadvantage of requiring a more complex and expensive tracker receiver, it has the advantage of avoiding the need for a transformation and for the use of a 50/50 beam splitter so that less light is lost and approximately 100% of the light is incident on the imaging region 810. The two trackers 700 and 800 constitute alternative solutions in providing a difference image without having to wait until two images are read out from one or two tracker receivers. Both trackers can be used interchangeably in the apparatuses shown in FIGS. 1B, 1C, 2 and 5, whereas FIGS. 2 and 5 are discussed in more detail in the following.

FIG. 2 illustrates a detailed embodiment of a surveying apparatus 200. The surveying apparatus 200 is a detailed example of surveying apparatus 100A, 100B, 100C. Hence, the elements, and particularly details thereof, discussed with respect to FIG. 2 can be combined with elements of the surveying apparatuses 100A, 100B and 100C and vice versa.

In FIG. 2, details of the lens arrangement, tracker, imaging unit and distance measuring unit shown in the previous figures are discussed by referring to lens arrangement 210, tracker 230, imaging unit 220 and distance measuring unit 240.

The lens arrangement 210 is depicted with a housing and a front opening 218. The opening 218 may comprise a fixed final focus lens on the optical axis of the lens arrangement. Further, the lens arrangement 210 comprises the focus lens element 116, which may be a compound lens or an individual lens having preferably a convex side facing the beam splitter/combiner 250. The focus lens element is arranged to be movable in the direction of the optical axis so as to provide different focus settings to sight an object.

The zoom lens element 214 may also be a compound lens or an individual lens and is arranged to be movable in the direction of the optical axis. The zoom lens element 214 is adapted to zoom. In other words, changing the position of the zoom lens element, leads to a change in the field of view. The focus lens element 116 and the zoom lens element 214 form a zoom optic and can be moved by drives. In particular, the lens arrangement is configured to maintain a magnification ratio so that an image size of the object on the imaging unit 220 is maintained constant. This may be achieved by driving the movable focus lens element 116 and the zoom lens element 214 accordingly.

Fixing the zoom optic to a constant magnification ratio has the advantage that objects, such as reflectors, have the same size simplifying image processing. For example, an object of 1 cm in the field has the same number of pixels in an image independent of whether it is at a distance of 10 m or 40 m.

Similarly, for outgoing light, e.g. distance measuring light of the distance measuring unit 240, the spot size of the outgoing laser light has always the same size on the object. Further, moving the lens elements 214, 116 depending on each other reduces the calibration effort.

The lens arrangement 210 is further configured to switch between a narrow field of view and a wide field of view. For example, by adjusting the position of the zoom lens element 214 the field of view obtainable by the lens arrangement can be changed. A wide field of view may be used to obtain an overview image of a scenery in which the object can be easily found and measured and/or tracked, while a narrow field of view may be used for taking a distance measurement. For example, the wide field of view can be used to obtain panoramic images in which measurement points can then be defined. Another advantage of panoramic images is that the images can be used to remotely control the surveying apparatus by viewing the images at a position remote to the surveying apparatus.

The beam splitter/combiner 250 in FIG. 2 is the same one as described with respect to FIGS. 1A, 1B and 1C and may comprise two prisms glued together. In another example, there may be an air gap between the two prisms. In addition to the previous embodiments, interfaces to the functional modules 220 and 230 are shown in more detail. For example, the additional prism element 257 which may form part of the prism system is provided to achieve a good optical connection to the imaging unit 220. In this example, the imaging unit 220 is an electronic imaging device having a camera chip, such as a CCD, which can be glued to the prism element 257. This reduces the need of additional mechanical components for positioning, adjusting and/or fixing the electronic imaging device to the additional prism element. The additional prism element 257 may also be glued to the beam splitter/combiner 250 so as to form a compact unit which should not require any optical adjustments even if mechanical shocks are applied.

The tracker channel of the multi-channel prism system 250 is indicated by a dotted line showing an approximation of the optical axis of the tracker 230. The tracker 230 comprises two tracker receivers 235 and 236 which may be realized by two camera chips schematically illustrated as hashed rectangles. One example of a tracker emitter is illustrated with reference sign 237. This tracker emitter may be made up of LEDs arranged in a ring surrounding the front opening 218 forming an LED array, which is located away from the tracker 230. These light-emitting diodes (LEDs) may emit infrared light in the same direction as the optical axis of the lens arrangement 210. Tracking light reflected from the object is then received in the lens arrangement 210 and split by the beam splitter/combiner 250 to follow the optical tracker path before being incident on beam splitter 255 which may be a single transparent mirror or prism cube. The beam splitter 255 divides the incoming light into two parts of back-reflected tracking light each preferably comprising 50% of the received intensity.

Accordingly, two images of tracking light reflected by an object and received by the surveying apparatus are obtained either in parallel or sequentially depending on when an image should be acquired. In the same way as discussed with respect to the additional prism element 257, the beam splitter 255 can be glued to the beam splitter/combiner 250 and to the camera chips of the tracker receivers.

In one embodiment, the first image may be acquired when the tracker emitter 237 is on and illuminates the object and the second image may be acquired shortly after when the tracker emitter 237 is off. In the same way, the first image may be acquired when the tracker emitter 237 is off and the second image may be acquired shortly after when the tracker emitter 237 is on and illuminates the object. As discussed in detail above with respect to FIGS. 7A and 7B, by subtracting the images a difference image of the tracking light reflected at the object can be derived.

The tracker 230 of FIG. 2 has the tracker design of tracker 700. However, alternatively, also the tracker design of tracker 800 may be applied in FIG. 2.

The distance measuring unit 240 in FIG. 2 shows a detailed example of the distance measuring unit 140 comprising a laser 244 and a detector 246 in the same module and having the same optical path for the laser emitter and detector. The laser may emit light in the red, as discussed with respect to FIG. 1A, or in the infrared wavelength range. The laser of the distance measuring unit 240 is adapted to emit laser light which is reflected by the beam splitter/combiner 250 so as to be output coaxially to the optical axis of the lens arrangement.

As schematically illustrated in FIG. 2, the laser light may follow the dashed line first passing the apertured mirror 248 (a.k.a. pinhole mirror) and then entering the beam splitter/combiner 250 where it is twice reflected before being outputted to the lens arrangement 210. After passing the two lenses elements 116 and 214 the focused laser light exits at the front opening 218 and is then reflected by an object (not shown).

The reflected laser light again passes through the lens arrangement 210, is reflected twice in the beam splitter/combiner 250 and is incident on the apertured mirror 248 in the distance measuring unit 240. Alternatively, a beam splitter instead of the aperture mirror (a highly reflective mirror with a pinhole to allow the laser light going through) can be used. This beam splitter may be a 50:50 beam splitter and parts of the reflected laser light are then detected on the detector 246. The detector 246 may be an avalanche photodiode.

Once the detector detects back-reflected measuring light, a controller of the surveying apparatus may use known methods, such as a pulse method or phase method, to perform a distance measurement.

FIG. 3 illustrates a part of the surveying apparatus 100A, 100B, 100C, 200 having an alternative arrangement of functional modules.

The beam splitter/combiner 350 again comprises two wedge shaped prisms which, however, are arranged differently to beam splitter/combiner 250 so that also the optical paths are different. In FIG. 3 the imaging/visual channel is located on the top and the visible light coming from the lens arrangement needs to be reflected twice to reach the imaging unit 320. The tracker 330 is again constituted by two tracker receivers 335 and 336 which both receive reflected tracking light from a beam splitter 355. The distance measuring unit 240 is the same as in FIG. 2.

FIG. 4 illustrates a specific example of a tracker which can be used together with the surveying apparatus.

The tracker 330' illustrated in FIG. 4 comprises two tracker receivers 335, 336 and the tracker emitter 337 in the same functional module 330'. It can be understood that the tracker 330' can replace the tracker 330 in FIG. 3 or the tracker 230 in FIG. 2. The advantage of the tracker 330' over the other trackers is that the light of the tracker emitter 337 has largely the same optical tracker path as the light falling on the tracker receivers. Further, since the tracking light of the tracker emitter 337 passes through the lens arrangement and its lenses, the light can be focused on the object so as to receive a stronger reflection back compared to the case of the tracker emitter 237. However, providing two beam splitters, as shown in FIG. 4, to arrange the optical axes of both tracker receivers and the tracker emitter on the same optical axis as the lens arrangement introduces more optical components and thus more complexity.

FIG. 5 illustrates a specific embodiment of a surveying apparatus 500 including details of the lens arrangement, tracker, imaging unit and distance measuring unit shown in the previous figures and referred to as lens arrangement 510, tracker 530, imaging unit 520 and distance measuring unit 540 in the following.

Specifically FIG. 5 shows an optical path 580 of the tracker (optical tracker path) by the dotted line passing the edges of the lenses in the lens arrangement 510 including the final focus lens 518, the zoom lens element 514 represented as compound lens, and the focus lens element 516 represented as compound lens, wherein the focus lens element 516 is movably arranged between the final focus lens and the beam splitter/combiner.

The optical tracker path 580 is further indicated in the prism system 550 having multiple reflections at the surfaces and further indicated in the beam splitter cube 555 to which the tracker emitter 537 and the tracker receiver 535 is attached in this example. The optical tracker path 580 can be filled with light from the tracker emitter 537, e.g. comprising one or more infrared (IR) LEDs or an infrared laser at approximately 850 nm. When the tracking light exits the lens arrangement 510 and hits the object 505, which is preferably a reflector made of a triple prism in this example, the reflected light enters again the lens arrangement 510 as a light beam reflected from the target. This light beam is indicated by the dashed line 590. Reflections of this dashed line in the prism system and the position where the light beam hits the tracker receiver 535, e.g. an IR camera chip, is also illustrated in FIG. 5.

In FIG. 5, the tracker 530 may have a tracker with the functionality of tracker 800. However, alternatively, also the tracker design of tracker 700 may be applied in FIG. 5. For example, tracker 530 may be replaced by tracker 330' of FIG. 4. In another example, tracker 530 may be replaced by tracker 230 or 330 as illustrated in FIGS. 2 and 3, respectively. In this case, the tracker emitter is preferably adapted as discussed with respect to tracker emitter 237, e.g. as an LED ring. For both tracker designs, it does not matter whether the tracker emitter is placed next to the tracker receiver (see e.g. FIG. 5) or placed at one end of the lens arrangement 110 (see e.g. FIG. 2).

Additionally, the reflector 505 and its surroundings may be imaged by the imaging unit 520 which receives visible light through the imaging channel comprising the optical element 557.

The distance measuring unit 540 is discussed in the following. Similar to the distance measuring units 140 and 240, the distance measuring unit 540 comprises a laser 544 and a detector 546. The distance measuring unit 540 is adapted to emit laser light from the laser 544 which passes through the beam splitter 548 and the lens 549 before being incident on the beam splitter/combiner 550. The laser wavelength may be in the red wavelength range, such as 635 nm, and the beam splitter/combiner 550 is adapted to reflect the laser light so as to overlap with the optical axis of the lens arrangement 510 when exiting the beam splitter/combiner 550, illustrated as prism system in FIG. 5.

Therefore, the laser light must pass several optical elements 548, 549, 550, 516, 514, 518 before being reflected by the reflector 505. Hence, back-reflected light may be detected not only from the reflector 505 but also from the other optical elements which could lead to the wrong assumptions regarding the distance to the reflector 505.

In detail, the time of flight of a laser pulse from the laser 544 to the reflector 505 may be used to measure the distance and if one of the several optical elements of the surveying apparatus also provides a reflection which can be detected by the detector 546, the distance measurement result may not be reliable. Therefore, care has been taken to avoid any undesired (multipath) reflections. For example, lens elements 549, 516, 514 and 518 are provided with anti-reflection coatings. Further, the lens element 549 may be chosen such that it focuses the laser light emitted by the laser 544 on an intermediate focus between the lens element 549 and the lower surface of the beam splitter/receiver 550 on which the laser light is incident. In particular, it is desired to avoid an intermediate focus on the prism surface facing the distance measuring unit 540 which could lead to strong back-reflections. Furthermore, this prism surface may be provided with an anti-reflection coating as well.

Additionally, the right lens of the focus lens element 516, i.e. the lens facing the beam splitter/combiner 550, has a convex side facing the beam splitter/combiner 550. This lens may be a plano-convex or a bi-convex lens, as shown. As a result, reflections from this lens of distance measuring light from the distance measuring unit 540 may not easily reflect back into the distance measuring unit 540 and reach the detector 546. Therefore, crosstalk which could lead to the detections of signals not coming from the actual target can be largely avoided.

Crosstalk can further be suppressed by the optical design and orientation of the prism system 550 and the lens groups 514 and 516. For example, the surfaces of the prism system 550 on which light is incident can be slightly tilted with respect to an orthogonal direction so that light is not fully orthogonally incident thereon. Furthermore, air gaps between individual prisms for total reflection can be provided where appropriate.

According to the above, there are several challenges when guiding the laser light of the distance measuring unit 540 through the prism system 550 and the lens arrangement 510 which have hindered the skilled person to consider such a coaxial alignment. By taking care of undesired back reflections, as outlined in the examples above, and by intelligently processing back-reflected light detected by the detector 546, the risk of unreliable measurement results can be mitigated.

For intelligent processing detected light, the surveying apparatus may comprise a controller. The controller, such as controller 608 of FIG. 6, may apply an electronic gating method, e.g. ignoring detected back reflections which are received very shortly after the laser pulse has been emitted so that only reasonable distances to an object of more than 2 m are considered, for example. In particular, the controller may be programmed to ignore detected back reflections which lead to a distance below a predetermined threshold value, e.g. 2 m. The functions of controller 608 may be distributed over the individual units of the surveying apparatus 600. In particular, the control function of the electronic gating method may be provided directly in the distance measuring unit 640.

On the other hand, using the optical setup shown in FIG. 5, the performance of the distance measuring unit, the tracker and lens arrangement can be improved compared to simple bi-axial systems, in which the optical axis of the lens arrangement and the optical axis of the laser measuring unit do not overlap. In the surveying apparatus 500 of FIG. 5, when guiding the laser light of the distance measuring unit 540 through the prism system 550 and the lens arrangement 510, the optics of the lens arrangement can be controlled to focus the laser light on the reflector 505 which leads to a better signal-to-noise ratio when receiving back reflected light. Additionally, the focused laser spot on the reflecting object is smaller than without focusing so that a higher resolution of the object can be obtained.

Figure 6:
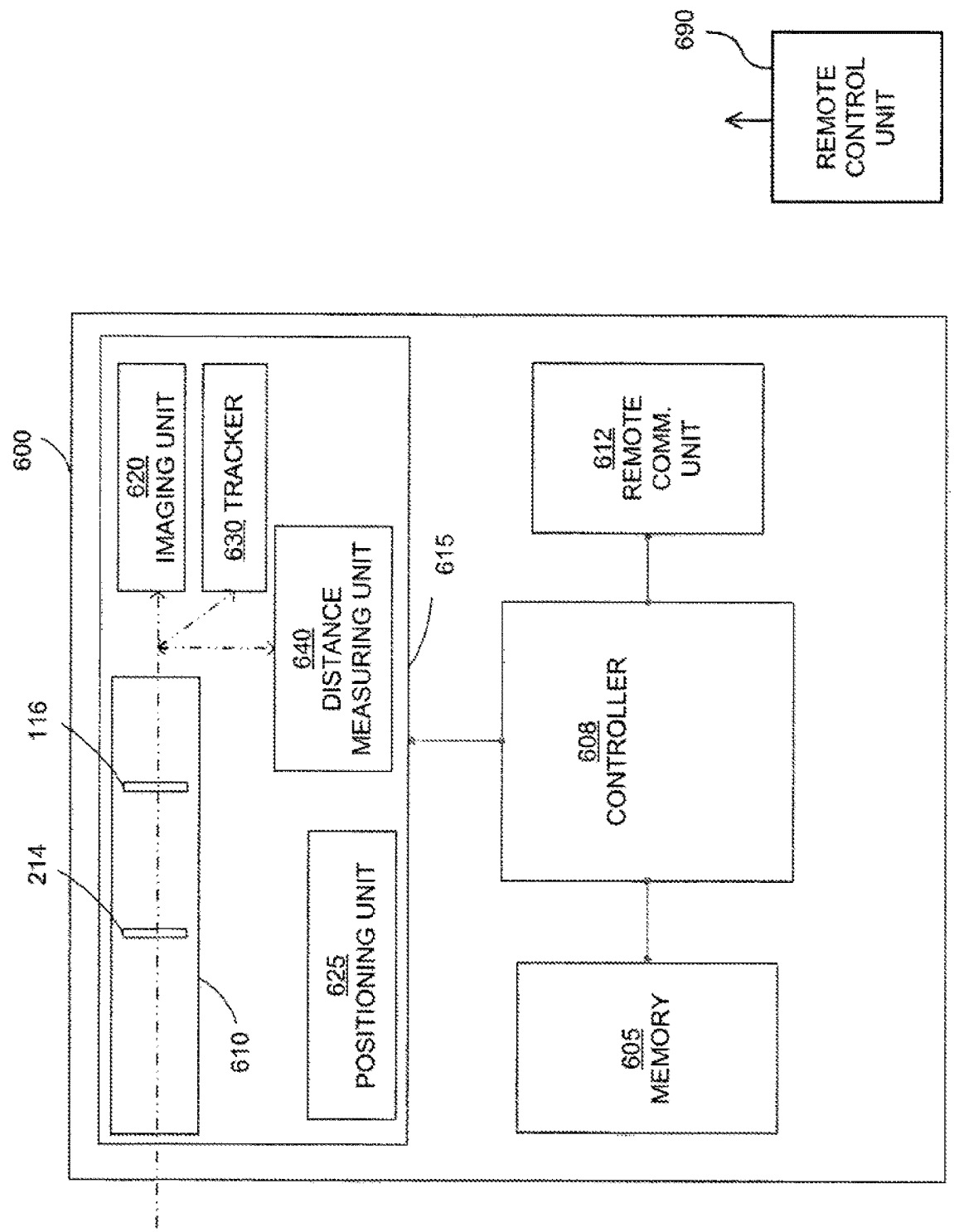
FIG. 6 illustrates elements of a surveying apparatus in a surveying system according to another embodiment emphasizing the communication and control between elements on a functional level.

FIG. 6 illustrates elements of a surveying apparatus 600 in a surveying system according to another embodiment emphasizing the communication and control between elements on a functional level. In addition to the surveying apparatus 600, the system may comprise the remote control unit 690 which can be used by an operator to control the surveying apparatus 690 or total station including such an apparatus.

The surveying apparatus 600 comprises an acquisition unit 615, a controller 608, memory 605 and remote communication unit 612 which may communicate with the remote control unit 690 to receive instructions therefrom.

The acquisition unit 615 may form a part of the head of a total station and comprises the lens arrangement 610 including the lens elements 214 and 116, the imaging unit 620, the tracker 630 and the distance measuring unit 640. Since the illustration in FIG. 6 is not concerned with the optical setup but explains the surveying apparatus 600 on a functional level, details about a prism system and the combination of different optical paths have been avoided and it is referred to the previous figures for details. The acquisition unit 615 further comprises a positioning unit 625 which is provided for adjusting the optical axis of the lens arrangement 610 relative to a reference axis, such as an axis of a polar coordinate system including a distance and two angles. For example, the positioning unit is realized by an electromechanical arrangement comprising preferably servo drives for precisely positioning the acquisition unit 615.

Accordingly, the positioning unit 625 may move the lens arrangement 610 to follow a moving object. In detail, when the optical arrangement 610 sights an object, the tracker 620 may track the sighted object. The tracker 620 may evaluate the movement of the object, e.g. in the controller 608, and may issue an instruction to the positioning unit 625 to move the optical axis of the lens arrangement. In this way, the head of the surveying apparatus or total station including the surveying apparatus may be moved to follow the object (target).

The control of the functional modules may constitute individual control elements controlling each module individually and being located close to or in the functional modules. The control elements may be realized by a hardware arrangement, such as hard-wired circuits or ASICs (application specific integrated circuits) or software or any suitable combination of the above. In particular, the control of the functions performed by the lens arrangement 610, the tracker 630, the imaging unit 620 and the distance measuring unit 640 may be realized by software.

In the surveying apparatus 600 of FIG. 6 individual control elements are combined in the controller 608. For example, a tracking control element, an imaging control element and a distance measuring control element may be realized by a processor running different software codes which may be stored in the memory 605.

Furthermore, the controller 608 may be configured to analyze the image of the object acquired by the imaging unit 620 and configured to issue an instruction to the lens arrangement 610 to move one or more lenses of the lens arrangement so as to maintain an image size of the object on the imaging unit constant and/or lens movement may be used for the autofocus. In the same way, the controller 608 may be configured to analyze the image of the object acquired by the tracker receiver of the tracker 630 and configured to issue an instruction to the lens arrangement 610 to move one or more lenses of the lens arrangement so as to maintain an image size of the object on the tracker receiver constant. Further, the controller 608 may be configured to analyze the back-reflected light detected by the detector of the distance measuring unit and calculate the distance to the object by considering the time when the laser pulse of the laser was emitted and the time when the back-reflected light was detected.

It will be apparent to those skilled in the art that various modifications and variations can be made in the trackers and apparatuses of the invention without departing from the scope of or spirit of the invention.

The invention has been described in relation to particular examples which are intended in all respect to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspect lie in less than all features of a single foregoing disclosed implementation or configuration. Thus, the true scope and spirit of the invention is indicated by the following claims.

The invention claimed is:

1. Tracker of a surveying apparatus for tracking a target, comprising:
    a first imaging region having a plurality of pixels on an image sensor arrangement for taking a first image of a scene including the target;
    a second imaging region having a plurality of pixels on the image sensor arrangement for taking a second image of a scene including the target;
    a control unit configured to:
        receive a timing signal, the timing signal indicating a time duration during which an illumination unit illuminating the target in the scene is switched on and off,
        control the first imaging region to take the first image of the scene when the timing signal indicates that the illumination unit is switched on, and
        control the second imaging region to take the second image when the timing signal indicates that the illumination unit is switched off; and a read out unit configured to read out, after taking the first and the second image, the first image from the first imaging region and the second image from the second imaging region and to obtain a difference image by determining a difference between the pixel values of the pixels of the first imaging region and the second imaging region so as to identify the target in the difference image, wherein the read out unit is configured, after taking the first and the second image, to correct for a movement of the tracker in a time between taking the first and the second image by taking into account an offset between the scene on the first image and the scene on the second image, the offset corresponding to a shift in the scene due to the movement of the tracker.

2. The tracker according to claim 1, wherein the image sensor arrangement comprises a first and a second tracker receiver including the first and second imaging region, respectively, and each receiving a part of back-reflected tracking light split by a beam splitter.

3. The tracker according to claim 1, wherein the tracker is calibrated by setting a center of the second imaging region depending on an optical center of the first imaging region.

4. The tracker according to claim 1, wherein the tracker comprises a tracker emitter for emitting tracking light on an optical tracker path.

5. The tracker according to claim 1, wherein the tracker is adapted to issue an instruction to a surveying apparatus to move an optical axis of a lens arrangement of the surveying apparatus.

6. Surveying apparatus for surveying a target, comprising:
a lens arrangement including at least one movably arranged focus lens element for focusing to sight a target;
an imaging unit configured to obtain an image of at least a part of the target; and the tracker according to claim 1.

7. The surveying apparatus according to claim 6, further comprising:
a beam splitter/combiner configured to combine a part of an optical imaging path of the imaging unit and a part of an optical tracker path of the tracker so that an optical axis of the imaging unit and the optical axis of the tracker are at least coaxially arranged with the optical axis of the lens arrangement between the lens arrangement and the beam splitter/combiner.

8. The surveying apparatus according to claim 6, further comprising:
a distance measuring unit configured to measure a distance to the target along an optical axis of the distance measuring unit.

9. The surveying apparatus according to claim 7, wherein the beam splitter/combiner is further configured to combine the part of the optical tracker path of the tracker, the part of the optical imaging path of the imaging unit and a part of an optical distance measuring path of a distance measuring unit so that the optical axis of the tracker, the optical axis of the imaging unit and the optical axis of the distance measuring unit are at least coaxially arranged with the optical axis of the lens arrangement between the lens arrangement and the beam splitter/combiner.

10. Method for tracking a target using a tracker of a surveying apparatus, comprising:
taking a first image of a scene including the target on a first imaging region having a plurality of pixels; and
taking a second image of a scene including the target on a second imaging region having a plurality of pixels;
wherein a timing signal is received, the timing signal indicating a time duration during which an illumination of the target in the scene is switched on and off; and the first imaging region is controlled to take the first image of the scene when the timing signal indicates that the illumination is switched on and the second imaging region is controlled to take the second image when the timing signal indicates that the illumination is switched off; and the method further comprises:
reading out the first image from the first imaging region and the second image from the second imaging region and obtaining a difference image by determining a difference between the pixel values of the pixels of the first imaging region and the second imaging region so as to identify the target in the difference image; and
correcting for a movement of the tracker in a time between taking the first image and the second image by taking into account an offset between the scene on the first image and the scene on the second image, the offset corresponding to a shift in the scene due to the movement of the tracker.

11. A non-transitory computer readable medium including instructions adapted to cause data processing means to carry out the method of claim 10.

12. Tracker of a surveying apparatus for tracking a target, comprising:
a first imaging region having a plurality of pixels on an image sensor arrangement for taking a first image of a scene including the target;
a second imaging region having a plurality of pixels on the image sensor arrangement for taking a second image of a scene including the target;
a control unit configured to:
receive a timing signal, the timing signal indicating a time duration during which an illumination unit illuminating the target in the scene is switched on and off,
control the first imaging region to take the first image of the scene when the timing signal indicates that the illumination unit is switched on, and
control the second imaging region to take the second image when the timing signal indicates that the illumination unit is switched off; and
a read out unit configured to read out, after taking the first and the second image, the first image from the first imaging region and the second image from the second imaging region and to obtain a difference image by determining a difference between the pixel values of the pixels of the first imaging region and the second imaging region so as to identify the target in the difference image, wherein the image sensor arrangement comprises a first and a second tracker receiver including the first and second imaging region, respectively, and each receiving a part of back-reflected tracking light split by a beam splitter.

13. The tracker according to claim 12, wherein the tracker is calibrated by setting a center of the second imaging region depending on an optical center of the first imaging region.

14. The tracker according to claim 12, wherein the read out unit is configured, after taking the first and the second image, to correct for a movement of the tracker in a time between taking the first and the second image by taking into account an offset between the scene on the first image and the scene on the second image, the offset corresponding to a shift in the scene due to the movement of the tracker.

15. The tracker according to claim 12, wherein the tracker comprises a tracker emitter for emitting tracking light on an optical tracker path.

16. The tracker according to claim 12, wherein the tracker is adapted to issue an instruction to a surveying apparatus to move an optical axis of a lens arrangement of the surveying apparatus.

17. Surveying apparatus for surveying a target, comprising:
   a lens arrangement including at least one movably arranged focus lens element for focusing to sight a target;
   an imaging unit configured to obtain an image of at least a part of the target; and
   the tracker according to claim 12.

18. The surveying apparatus according to claim 17, further comprising:
   a beam splitter/combiner configured to combine a part of an optical imaging path of the imaging unit and a part of an optical tracker path of the tracker so that an optical axis of the imaging unit and the optical axis of the tracker are at least coaxially arranged with the optical axis of the lens arrangement between the lens arrangement and the beam splitter/combiner.

19. The surveying apparatus according to claim 17, further comprising:
   a distance measuring unit configured to measure a distance to the target along an optical axis of the distance measuring unit.

20. The surveying apparatus according to claim 18, wherein the beam splitter/combiner is further configured to combine the part of the optical tracker path of the tracker, the part of the optical imaging path of the imaging unit and a part of an optical distance measuring path of a distance measuring unit so that the optical axis of the tracker, the optical axis of the imaging unit and the optical axis of the distance measuring unit are at least coaxially arranged with the optical axis of the lens arrangement between the lens arrangement and the beam splitter/combiner.

* * * * *